United States Patent
Hao et al.

(10) Patent No.: US 12,344,944 B2
(45) Date of Patent: Jul. 1, 2025

(54) METHOD FOR HF-FREE FACILE AND RAPID SYNTHESIS OF MXenes RELATED COMPOUNDS

(71) Applicant: THE HONG KONG POLYTECHNIC UNIVERSITY, Hong Kong (CN)

(72) Inventors: Jianhua Hao, Hong Kong (CN); Sin Yi Pang, Hong Kong (CN)

(73) Assignee: THE HONG KONG POLYTECHNIC UNIVERSITY, Hong Kong (CN)

(*) Notice: Subject to any disclaimer, the term of this patent is extended or adjusted under 35 U.S.C. 154(b) by 516 days.

(21) Appl. No.: 16/946,459

(22) Filed: Jun. 23, 2020

(65) Prior Publication Data
US 2020/0399771 A1    Dec. 24, 2020

Related U.S. Application Data

(60) Provisional application No. 62/865,353, filed on Jun. 24, 2019.

(51) Int. Cl.
| | |
|---|---|
| *C25B 1/00* | (2021.01) |
| *C01B 32/914* | (2017.01) |
| *C01B 32/921* | (2017.01) |
| *C25B 11/069* | (2021.01) |
| *C25F 5/00* | (2006.01) |
| *C01B 21/06* | (2006.01) |
| *C01B 21/076* | (2006.01) |

(52) U.S. Cl.
CPC .......... *C25B 11/069* (2021.01); *C01B 32/914* (2017.08); *C01B 32/921* (2017.08); *C25B 1/00* (2013.01); *C25F 5/00* (2013.01); *C01B 21/0617* (2013.01); *C01B 21/076* (2013.01)

(58) Field of Classification Search
CPC ... C25B 11/04; C25F 3/02; C25F 3/08; C01B 11/069; C01B 21/076; C01B 21/0617; C01B 32/914; C01P 2004/20
See application file for complete search history.

(56) References Cited

U.S. PATENT DOCUMENTS

| | | | |
|---|---|---|---|
| 9,416,011 B2 | 8/2016 | Barsoum et al. | |
| 2014/0162130 A1* | 6/2014 | Barsoum | C01B 32/914 429/231.8 |
| 2018/0309125 A1* | 10/2018 | Beidaghi | H01M 4/463 |

OTHER PUBLICATIONS

Tripathi et al, "High yield synthesis of electrolyte heating assisted electrochemically exfoliated graphene for electromagnetic interference shielding applications", Feb. 9, 2015, RSC Advances, vol. 5, p. 19074-19081. (Year: 2015).*

(Continued)

*Primary Examiner* — Luan V Van
*Assistant Examiner* — Andrew Koltonow
(74) *Attorney, Agent, or Firm* — S&F/WEHRW

(57) ABSTRACT

Provided herein is a method for preparing MXenes, such as $Ti_2CT_x$, $Cr_2CT_x$, and $V_2CT_x$, products prepared therefrom, and compositions and devices including the same.

7 Claims, 36 Drawing Sheets

(56) References Cited

OTHER PUBLICATIONS

Li et al, "Advanced Composite 2D Energy Materials by Simultaneous Anodic and Cathodic Exfoliation", Jan. 22, 2018, Advanced Energy Materials, vol. 8, article No. 1702794, p. 1-8 (Year: 2018).*
Yang et al, "Emerging 2D Materials Produced via Electrochemistry", Jan. 31, 2020, Advanced Materials, vol. 32, article #1907857, p. 1-19. (Year: 2020).*
Yang et al "Fluoride-Free Synthesis of Two-Dimensional Titanium Carbide (MXene) Using A Binary Aqueous System", Oct. 14, 2018, Angewandte Chemie International Edition, 57, 15491-15495. (Year: 2018).*
Naguib, M. et.al., Two-dimensional nanocrystals produced by exfoliation of Ti3AlC2. Adv. Mater. 2011, 23, 4248-4253.
W. Sun et.al., Electrochemical etching of Ti2AlC to Ti2CTx (MXene) in low-concentration hydrochloric acid solution, J. Mater. Chem. A, 2017, 5, 21663-21668.
Sheng Yang et.al., Fluoride-Free Synthesis of Two-Dimensional Titanium Carbide (MXene) Using A Binary Aqueous System, Angew. Chem. 2018, 130, 15717-15721.
Sin-Yi Pang et.al., Universal Strategy for HF-Free Facile and Rapid Synthesis of Two-dimensional MXenes as Multifunctional Energy Materials, J. Am. Chem. Soc. 2019, 141, 24, 9610-9616.
Sin-Yi Pang et.al. Efficient Energy Conversion and Storage Based on Robust Fluoride-Free Self-Assembled 1D Niobium Carbide in 3D Nanowire Network, Adv. Sci. 2020, 1903680, 1-8.
Y. Medkour, et al., 7-Electrical properties of MAX phases, Advances in Science and Technology of Mn+1AXn Phases, 2012, pp. 159-175.

* cited by examiner d c

METHOD FOR HF-FREE FACILE AND RAPID SYNTHESIS OF MXenes RELATED COMPOUNDS

CROSS-REFERENCE TO RELATED APPLICATIONS

This application claims the benefit of priority of U.S. Provisional Application No. 62/865,353, filed on Jun. 24, 2019, the contents of which being hereby incorporated by reference in their entirety for all purposes.

TECHNICAL FIELD

The present disclosure generally relates to a method of preparing MXenes. More particularly, the present disclosure relates to a rapid fluorine-free electrochemical etching (e-etching) method for preparing MXenes.

BACKGROUND

As an emerging class of two-dimensional (2D) material, MXenes have gained much interest owing to their outstanding electrical conductivity, stability, hydrophilicity and porosity, which contribute to their widespread development in electrocatalysis, energy storage and biomedical applications.

MXenes can be described by a chemical formula of $M_{n+1}X_nT_x$ or $M_2M'_nX_{n+1}T_x$, wherein n=1, 2 or 3; M and M' can be a transition metal, such as an M is an early transition metal; X can be C and/or N; and $T_x$ is one or more surface functional groups that can be selected from O, OH, F, and Cl.

MXenes are commonly prepared by selective chemical etching of A elements from the layered MAX materials, $M_{n+1}AX_n$, wherein A can be an element selected from group 13 and 14, such as Al, with HF, $NH_4HF_2$ or a mixture of LiF/HCl. Aqueous HF is a hazardous reagent with the potential for causing systemic toxicity in human body and fatality, in addition to its highly corrosive property. The direct use or in-situ formation of HF in these methods raises considerable safety and environmental concerns, hindering extensive studies and development of MXenes. In particular, $V_2C$ requires aggressive etching conditions, such as exposure to 50% concentrated HF for 92 h, for production; while $Cr_2C$ is unable to be prepared even via a molten salt route under high temperature and pressure. Hence, it is a challenge to prepare the aforementioned MXenes on an industrial scale.

Therefore, there is a need to develop fluorine-free strategies for MXenes synthesis that address or overcome at least some of the challenges raise above.

SUMMARY

Accordingly, it is an object of the present disclosure to provide a universal HF-free strategy to synthesize 2D MXene by a thermal-assisted 3D electrode electrochemical etching method, such as $Ti_2CT_x$, $Ti_2NT_x$, $Ti_3C_2T_x$, $V_2CT_x$, $Cr_2CT_x$, $Mo_2CT_x$, $Mo_3C_2T_x$, $Nb_2CT_x$, and $Ta_2CT_x$. The MXenes prepared using the methods described herein can be applied for the production, e.g., high power supercapacitors, metal ion batteries, and electrocatalysts for use in fuel cells.

Compared to traditional HF etching methods for preparing MXenes, the methods described herein are rapid and facile. For example, the methods described herein can prepare $V_2C$ MXenes in as little as 1/10 the time of convention HF etching methods.

In a first aspect, provided herein is a method for preparing a MXene, the method comprising: providing a composite electrode comprising at least one MAX-phase composition and a carbonaceous material, wherein the at least one MAX-phase composition has an empirical formula of $M_{n+1}AX_n$ or $M_2M'_nX_{n+1}$, wherein each of M and M' is independently a Group IIIB, IVB, VB, or VIB metal; A is a Group IIB, IIIA, IVA, or VA element; and each X is C, N, or a combination thereof; and n is 1, 2, or 3; a counter electrode; and an electrolyte solution comprising an etchant between and in contact with the composite electrode and the counter electrode; and applying an electric current between the composite electrode and the counter electrode resulting in electrolytic reduction of the at least one MAX-phase composition thereby forming the MXene, wherein the electrolytic reduction is conducted at a temperature between 25 to 80° C.

In a first embodiment of the first aspect, provided herein is the method of the first aspect, wherein the electric current is applied at a voltage 2 V or less.

In a second embodiment of the first aspect, provided herein is the method of the first aspect, wherein the etchant is chloride.

In a third embodiment of the first aspect, provided herein is the method of the first aspect, wherein the carbonaceous material is carbon black (CB), carbon fiber cloth (CFC), or a mixture thereof.

In a fourth embodiment of the first aspect, provided herein is the method of the first aspect, wherein the composite electrode further comprises a binder.

In a fifth embodiment of the first aspect, provided herein is the method of the first aspect, wherein the at least one MAX-phase composition and the carbonaceous material are present in the composite electrode in a mass ratio of 80:20 to 99:1, respectively.

In a sixth embodiment of the first aspect, provided herein is the method of the fifth embodiment of the first aspect, wherein the composite electrode further comprises a binder, wherein the binder is present in the composite electrode at 0.1 to 3% by weight.

In a seventh embodiment of the first aspect, provided herein is the method of the first aspect, wherein the electrolytic reduction is conducted at a temperature between 30 to 70° C.

In an eighth embodiment of the first aspect, provided herein is the method of the first aspect, wherein each of M and M' is independently Hf, Cr, Mn, Mo, Nb, Sc Ta, Ti, V, W, or Zr; and A is Al.

In a ninth embodiment of the first aspect, provided herein is the method of the eighth embodiment of the first aspect, wherein the electrolyte solution comprises 0.5 to 1.5 M HCl.

In a tenth embodiment of the first aspect, provided herein is the method of the ninth embodiment of the first aspect, wherein each of M and M' is independently Hf, Cr, Mn, Mo, Nb, Sc Ta, Ti, V, W, or Zr; and A is Al.

In an eleventh embodiment of the first aspect, provided herein is the method of the first aspect, wherein the applying an electric current is maintained for 10 hours or less.

In a twelfth embodiment of the first aspect, provided herein is the method of the first aspect, wherein the method comprises: providing a composite electrode comprising at least one MAX-phase composition, a carbonaceous material and a binder, wherein the at least one MAX-phase composition has an empirical formula of $M_{n+1}AX_n$ or $M_2M'_nX_{n+1}$, wherein each of M and M' is independently Hf, Cr, Mn, Mo, Nb, Sc Ta, Ti, V, W, or Zr; and A is Al; and each X is C, N, or a combination thereof; and n is 1, 2, or 3; a counter electrode; and an electrolyte solution between and in contact with the composite electrode and the counter electrode having a pH of 1 or less; and applying an electric current between the composite electrode and the counter electrode at a voltage 2 V or less resulting in the electrolytic reduction of the at least one MAX-phase composition thereby forming the MXene, wherein the electrolytic reduction is conducted at a temperature between 30 to 70° C.

In a thirteenth embodiment of the first aspect, provided herein is the method of the eleventh embodiment of the first aspect, wherein the electrolytic reduction is conducted at a temperature between 40 to 60° C.

In a fourteenth embodiment of the first aspect, provided herein is the method of the eleventh embodiment of the first aspect, wherein the electrolyte solution comprises 0.5 to 1.5 M HCl.

In a fifteen embodiment of the first aspect, provided herein is the method of the eleventh embodiment of the first aspect, wherein the at least one MAX-phase composition and the carbonaceous material are present in the composite electrode in a mass ratio of 80:20 to 99:1, respectively and the binder is present in the composite electrode 0.1 to 2% by weight.

In a sixteenth embodiment of the first aspect, provided herein is the method of the eleventh embodiment of the first aspect, wherein each of M and M' is independently Hf, Cr, Mn, Mo, Nb, Sc Ta, Ti, V, W, or Zr; and A is Al.

In a seventeenth embodiment of the first aspect, provided herein is the method of the eleventh embodiment of the first aspect, wherein at least one MAX-phase composition has an empirical formula of $M_{n+1}AX_n$ and M is Cr, Ti, and V; A is Al.

In a second aspect, provided herein is a method for preparing a MXene, the method comprising: providing a composite electrode comprising at least one MAX-phase composition; a carbonaceous material selected from the group consisting of CB, CFC, and combinations thereof; a binder, wherein the at least one MAX-phase composition has an empirical formula of $M_{n+1}AX_n$, wherein each of M is Cr, Ti, and V; A is Al; and each X is C or N; and n is 1, 2, or 3; wherein the at least one MAX-phase composition and carbonaceous material are present in the composite electrode in a mass ratio of 90:10 to 99:1; and wherein the binder is present in the composite electrode in a weight ratio of 1.0-1.5% by mass; a counter electrode; and an electrolyte solution comprising 0.5 to 1.5 M HCl between and in contact with the composite electrode and the counter electrode; and applying an electric current between the composite electrode and the counter electrode at a voltage 0.2 to 1.5 V for 8 to 10 hours resulting in the electrolytic reduction of the at least one MAX-phase composition thereby forming the MXene, wherein the electrolytic reduction is conducted at a temperature between 45 to 55° C.

In a third aspect, provided herein is a MXene formed according to the method of the first aspect.

General laboratories have restricted the use of HF due to its toxicity. This toxic gas needs to be handled carefully for traditional HF etching methods, which severely restricts laboratories equipped to safely synthesize MXenes. Compared to traditional methods, the methods described herein are safer and more cost effective, which enables mass production of MXenes.

In addition, MXenes prepared using traditional methods can contain HF residues that may induce fuel cell death when the thus prepared MXenes are used to fabricate a fuel cell. Since the method of the present disclosure does not involve HF, it can be used to prepare HF residue free MXenes, which can be used in the fabrication of fuel cells and in biomedical applications.

Moreover, the structural and surface properties of the MXenes ($Ti_2CT_x$) prepared using the E-etching method of the present disclosure can change by modifying the E-etching conditions. The method of the present disclosure can also be readily applied in the preparation of other MXenes (e.g. $V_2CT_x$ and $Cr_2CT_x$), which provides an effective solution to the long-standing problem of using HF etching methods and demonstrates its promise to be a general protocol for MXene preparation.

Those skilled in the art will appreciate that the disclosure described herein is susceptible to variations and modifications other than those specifically described.

Other aspects and advantages of the disclosure will be apparent to those skilled in the art from a review of the ensuing description.

BRIEF DESCRIPTION OF DRAWINGS

The above and other objects and features of the present disclosure will become apparent from the following description of the disclosure, when taken in conjunction with the accompanying drawings, in which.

DETAILED DESCRIPTION

Figure 1:
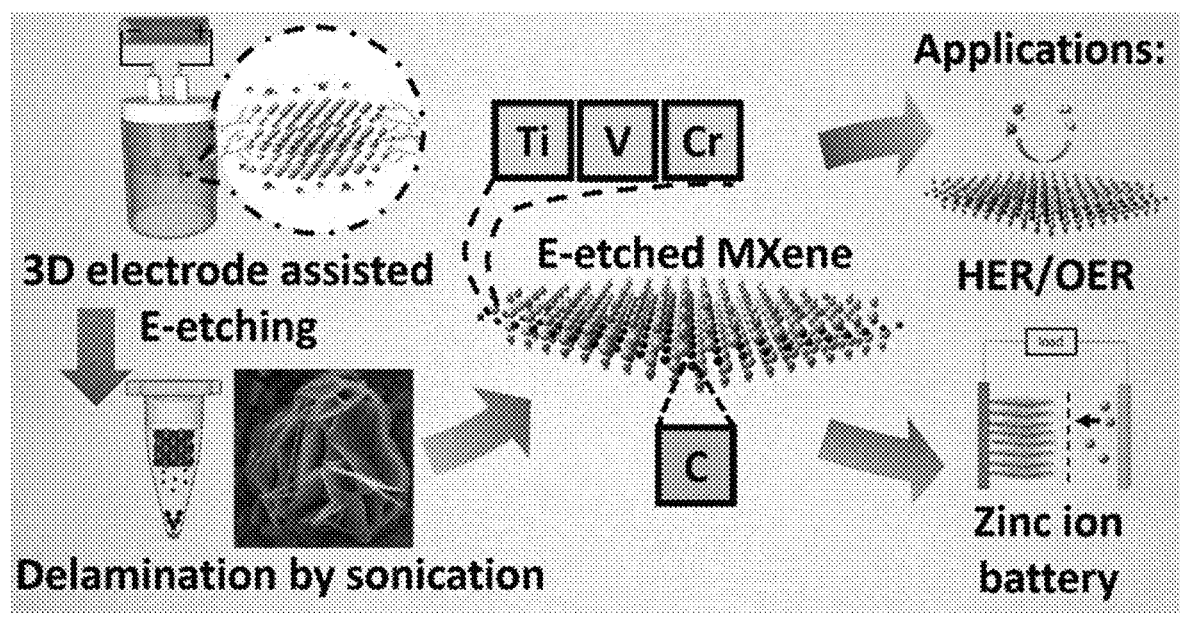
FIG. 1 depicts a schematic illustration of an exemplary strategy for HF-free facile and rapid synthesis of two-dimensional MXenes as multifunctional energy materials according to certain embodiments of the present disclosure.

Provided herein are highly efficient methods for the preparation of a broad range of MXenes, products thereof, and compositions or devices comprising the same. The methods provided herein utilize standard laboratory equipment and do not require the use of fluoride based etching reagents that are commonly used in convention methods for preparing MXenes. In the light of these long-standing problems, an efficient and mild thermal-assisted E-etching method is herein described to prepare fluorine-free MXenes ($Ti_2CT_x$, $Cr_2CT_x$ and $V_2CT_x$) with a 3D composite electrode of carbon black (CB) additive and carbon fiber cloths (CFCs) porous substrate. The mild heating accelerates the etching of MAX materials in the presence of a mild etchant, such as hydrochloric acid. Importantly, E-etching is commonly adopted to prepare Ti-based MXenes while reports on synthesizing other metal-based MXenes (e.g. $Cr_2C$ and $V_2C$) are lacking despite their potentially sophisticated properties in electrochemical applications. As a proof-of-concept, the methods described herein have been used to synthesize $Cr_2CT_x$ and $V_2CT_x$ as well, which are well known to be challenging to produce using conventional methods. The success in preparing these MXenes strongly indicates that the methods described herein can be a mild and universal route for preparing various MXenes.

MXenes refer to compositions having one or more layers, each layer comprising a substantially two-dimensional array of crystal cells. The MXene may comprise one transition metal or two transition metals, which may be referred to as a "single transition metal MXene" or a "double transition metal MXene", respectively).

Single transition metal MXenes comprise one or more layers, wherein each layer has a first and a second surface, each layer comprising substantially two-dimensional array of crystal cells having an empirical formula of $M_{n+1}X_n$, such that each X is positioned within an octahedral array of M; wherein M is at least one Group IIIB, IVB, VB, or VIB metal; wherein each X is C, N, or a combination thereof (i.e., stoichiometrically $X=C_xN_y$, including where x+y=1); and n=1, 2, or 3, wherein at least one of said surfaces of the layers has surface terminations, $T_x$, binding to M, independently comprising alkoxide, alkyl, carboxylate, halide (e.g., fluoride, chloride, bromide, or iodide), hydroxide, hydride, oxide, sub-oxide, nitride, sub-nitride, sulfide, sulfonate, thiol, or a combination thereof. In certain embodiments, these compositions comprise a plurality of layers. Other embodiments provide for stacked assemblies of such layers.

Double transition metal MXenes comprise one or more layers, wherein each layer has a first and a second surface, each layer comprising a substantially two-dimensional array of crystal cells having an empirical formula of $M_2M'_nX_{n+1}$, such that each X is positioned within an octahedral array of M and M; wherein M and M' each comprise different Group IIIB, IVB, VB, or VIB metals; wherein each X is C, N, or a combination thereof (i.e., stoichiometrically $X=C_xN_y$, including where x+y=n+1); and n=1 or 2, wherein at least one of said surfaces of the layers has surface terminations, $T_x$, binding to M, independently comprising alkoxide, alkyl, carboxylate, halide (e.g., fluoride, chloride, bromide, or iodide), hydroxide, hydride, oxide, sub-oxide, nitride, sub-nitride, sulfide, sulfonate, thiol, or a combination thereof. In certain embodiments, these compositions comprise a plurality of layers. Other embodiments provide for stacked assemblies of such layers.

The method for preparing the MXene, in accordance with embodiments described herein, include the step of removing an A atomic layer by electrolytic reduction from a MAX-phase composition comprising an empirical formula of $M_{n+1}AX_n$ or $M_2M'_nAX_{n+1}$ to form the MXene nanosheet having a formula of $M_{n+1}X_n$ or $M_2M'_nX_{n+1}$, respectively, wherein at least one of the surfaces of the layers has surface terminations, $T_x$. It should be noted that the MXene surfaces are typically not M-terminated (e.g., terminated with a metal), but can be terminated with halide, nitride, sub-nitride, oxide, sub-oxide, hydroxide, or a combination thereof. It should be understood that while MXenes may be referred to herein with respect to the empirical formulas $M_{n+1}X_n$ or $M_2M'_nX_{n+1}$, such compositions typically contain surface terminations, $T_x$. Thus, unless clear from the specific context, MXenes can be interchangeably referred to using the empirical formulas of $M_{n+1}X_n$ or $M_2M'_nX_{n+1}$ or $M_{n+1}X_nT_x$ or $M_2M'_nX_{n+1}T_x$.

In certain embodiments, the method for preparing a MXene comprises: providing a composite electrode comprising at least one MAX-phase composition and a carbonaceous material, wherein the at least one MAX-phase composition has an empirical formula of $M_{n+1}AX_n$ or $M_2M'_nX_{n+1}$, wherein each of M and M' is independently a Group IIIB, IVB, VB, or VIB metal; A is a Group IIB, IIIA, IVA, or VA element; and each X is C, N, or a combination thereof; and n is 1, 2, or 3; a counter electrode; and an electrolyte solution comprising an etchant between and in contact with the composite electrode and the counter electrode; and applying an electric current between the composite electrode and the counter electrode resulting in the electrolytic reduction of the at least one MAX-phase composition thereby forming the MXene, wherein the electrolytic reduction is conducted at a temperature between 25 to 80° C.

The MAX-phase compositions having an empirical formula $M_{n+1}AX_n$ and $M_2M'_nAX_{n+1}$ are layered hexagonal carbide, nitride, or carbonitride referred to herein as "MAX phase" or a "MAX-phase composition". The MAX-phase can have a structure including alternating arrays of a carbide and/or nitride layer (layer having a formula of $M_{n+1}X_n$ or $M_2M'_nX_{n+1}$, hereinafter, referred to as "MXene layer") and an A atomic layer, the carbide and/or nitride layer being formed by a two-dimensional array of unit cells, in which each X is positioned within an octahedral array of six transition metals (M and/or M'). The MXene layer and the A atomic layer are stacked by ionic metallic bonding.

Each of M and M' can be at least one transition metal selected from Group 3, Group 4, Group 5, and Group 6 on the periodic table of the elements, A can be at least one element selected from Group 12, Group 13, Group 14, Group 15 and Group 16 on the periodic table of the elements, X is carbon (C), nitrogen (N), or a combination thereof, n is 1, 2 or 3. Each of M and M' can independently be at least one transition metal selected from the group consisting of scandium (Sc), yttrium (Y), lutetium (Lu), titanium (Ti), zirconium (Zr), hafnium (Hf), vanadium (V), niobium (Nb), tantalum (Ta), chromium (Cr), molybdenum (Mo), and tungsten (W). In certain embodiments, each of M and M' is independently at least one transition metal selected from Sc, Ti, V, Cr, Zr, Nb, Mo, Hf and Ta.

A can be selected from the group consisting of aluminum (Al), silicon (Si), phosphorus (P), sulfur (S), gallium (Ga), germanium (Ge), arsenic (As), cadmium (Cd), indium (In), tin (Sn), thallium (Tl) and lead (Pb). In certain embodiments, A is Al.

The MAX phases can be divided into three classes depending on their n-value in the formula: $M_{n+1}AX_n$. $M_2AX$, wherein n is 1 belongs to "211" class, $M_3AX_2$, wherein n is 2 belongs to "312" class, and $M_4AX_3$, wherein n is 3 belongs to "413" class.

Exemplary MAX phases having the empirical formula of $M_{n+1}AX_n$ include, but are not limited to: 211 class MAX phases, such as $Ti_2CdC$, $Sc_2InC$, $Ti_2AlC$, $Ti_2GaC$, $Ti_2InC$, $Ti_2TlC$, $V_2AlC$, $V_2GaC$, $Cr_2GaC$, $Ti_2AlN$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2AlC$, $Cr_2GeC$, $V_2PC$, $V_2AsC$, $Ti_2SC$, $Zr_2InC$, $Zr_2TlC$, $Nb_2AlC$, $Nb_2GaC$, $Nb_2InC$, $Mo_2GaC$, $Zr_2InN$, $Zr_2TlN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TlC$, $Ta_2AlC$, $Ta_2GaC$, $Hf_2SnC$, $Hf_2PbC$, $Hf_2SnN$, $Hf_2SC$; 312 class MAX phases, such as $Ti_3AlC_2$, $V_3AlC_2$, $Ti_3SiC_2$, $Ti_3GeC_2$, $Ti_3SnC_2$, $Ta_3AlC_2$; and 412 class MAX phases, such as $Ti_4AlN_3$, $V_4AlC_3$, $Ti_4GaC_3$, $Ti_4SiC_3$, $Ti_4GeC_3$, $Nb_4AlC_3$, $Ta_4AlC_3$. In certain embodiments, the MAX-phase composition comprises at least one of $Ti_2AlC$, $Ti_2AlN$, $Cr_2AlC$, $Cr_2AlN$, $V_2AlC$, and $V_2AlN$.

The methods described herein can be carried out using one or more electrolytic cells comprising two or more electrodes, wherein the two or more electrodes can comprise the composite electrode comprising at least one MAX-phase composition and a carbonaceous material (i.e., the cathodic working electrode), a counter electrode (or counter/reference electrode) and optionally a reference electrode (e.g., in a three electrode system).

A counter electrode refers to an electrode paired with the working electrode, through which passes a current equal in magnitude and opposite in sign to the current passing through the working electrode. The counter electrode can include counter electrodes which also function as reference electrodes (i.e., a counter/reference electrode). Any suitable counter electrode known in the art can be used in connection with the methods described herein. For example, the counter electrode can comprise carbon (e.g., highly oriented pyrolytic graphite), a metal (e.g., platinum), an alloy (e.g., stainless steel), glassy carbon, a conductive polymer, or the like.

The reference electrode can be selected from a standard hydrogen electrode, calomel electrode, copper-copper (II) sulfate electrode, silver chloride electrode, palladium-hydrogen electrode, mercury-mercurous sulfate electrode, and the like.

The carbonaceous material can be at least one material selected from the group consisting of CB, CFC, or a mixture thereof graphite, petroleum coke, acetylene black and the like The composite electrode can comprise the at least one MAX-phase composition and a carbonaceous material in a mass ratio between 10:90 to 99.9:0.1, respectively. In certain embodiments, the composite electrode can comprise the at least one MAX-phase composition and a carbonaceous material in a mass ratio between 20:80 to 99.9:0.1; 30:70 to 99.9:0.1; 40:60 to 99.9:0.1; 50:50 to 99.9:0.1; 60:40 to 99.9:0.1; 70:30 to 99.9:0.1; 80:20 to 99.9:0.1; 82:18 to 99.9:0.1; 84:16 to 99.9:0.1; 86:14 to 99.9:0.1; 88:12 to 99.9:0.1; 90:10 to 99.9:0.1; 90:10 to 99:1; 91:9 to 99:1; 92:8 to 99:1; 93:7 to 99:1; 94:6 to 99:1; 95:5 to 99:1; 96:4 to 99:1; 97:3 to 99:1; 98:2 to 99:1; 92:8 to 98:2; 93:7 to 97:3; or 94:6 to 97:3, respectively.

The composite electrode can optionally comprise a binder. The binder may optionally be cured to further bind the composite electrode and can increase the conductivity of composite electrode. Typical binders include, for example polyvinylidene fluoride (PVDF), polyvinyl alcohol (PVA), starch, sodium alginate, hydroxypropyl cellulose, carboxymethyl cellulose (CMC), regenerated cellulose, polyvinylpyrrolidone, polyimide, polyamideimide, polyethylene, polypropylene, an ethylene-propylene-diene terpolymer (EPDM), a sulfonated EPDM, a styrene-butadiene rubber, polytetrafluoroethylene (PTFE), a polyacrylic polymer, and combinations thereof. In certain embodiments, the binder is PVA.

The composite electrode can comprise between 0.01 to 5% by weight of the binder. In certain embodiments, the composite electrode comprises 0.01 to 4.5%, 0.01 to 4%, 0.01 to 3.5%, 0.01 to 3.0%, 0.01 to 2.5%, 0.01 to 2%, 0.1 to 2%, 0.5 to 2.0% 0.1 to 1.5%, 0.5 to 1.5%, 0.7 to 1.5%, 0.8 to 1.5%, 0.9 to 1.5%, 1.0 to 1.5%, 0.6 to 1.4%, 0.7 to 1.3%, 0.8 to 1.2%, or 0.9 to 1.1% by weight. In certain embodiments, the composite electrode comprises 1% or less binder; 1.5% or less binder, or 2.0% or less binder by weight.

It has been found that when the electrolytic reduction of the at least one MAX-phase composition is conducted at the voltage, pH, and temperature described herein that a wide variety of Mxene materials can be prepared without the need of HF related etching reagents.

In certain embodiments, the electrolytic reduction is conducted at a temperature between 25 to 80° C., 30 to 80° C., 30 to 75° C., 30 to 70° C., 35 to 65° C., 40 to 60° C., 40 to 70° C., 40 to 75° C., 45 to 55° C., 40 to 80° C., 45 to 80° C., 50 to 80° C., 50 to 75° C., 50 to 70° C., 50 to 65° C., or 50 to 60° C.

The voltage of the cell can vary depending on the redox potential of the at least one MAX-phase composition, but is generally 2 V or less. In certain embodiments, the electric current applied between the composite electrode and the counter electrode is 0.1 to 2.0 V, 0.1 to 1.9 V, 0.1 to 1.8 V, 0.1 to 1.7 V, 0.2 to 1.7 V, 0.3 to 1.7 V, 0.4 to 1.7 V, 0.5 to 1.7 V, 0.6 to 1.7 V, 0.7 to 1.7 V, 0.8 to 1.7 V, 0.9 to 1.7 V, 1.0 to 1.7 V, 1.1 to 1.7 V, 1.2 to 1.7 V, 0.1 to 1.0 V, 0.2 to 1.0 V, 0.3 to 1.0 V, 0.3 to 1.2 V, 0.3 to 0.9 V, 0.4 to 0.7 V, 0.2 to 0.8 V, 0.3 to 0.7 V, 0.4 to 0.6 V, 0.7 to 1.3 V, 0.8 to 1.2 V, or 0.9 to 1.1 V.

The step of applying an electric current between the composite electrode and the counter electrode can be conducted until all of staring material at least one MAX-phase composition is consumed, remaining at least one MAX-phase stops converts to the MXene product, and/or until a higher than desired quantity of impurities (such as over etched products) are formed (e.g., over-etched products in which M or M' are removed). The time required to complete the electrolytic reduction of the at least one MAX-phase composition can depend on a number of factors, such as applied voltage, temperature, pH, and redox potential of the at least one MAX-phase composition. The extent of the reaction and/or impurity formation can be monitored using any conventional method, such as monitoring the reference voltage. Advantageously, the methods described herein are capable to producing MXenes under mild conditions without significant over-etching of the of the desired MXene products. In certain embodiments, the step of applying an electric current between the composite electrode and the counter electrode can be conducted for 14 hours or less, 13 hours or less, 12 hours or less, 11 hours or less, 10 hours or less, 9 hours or less, 8 hours or less, 7 hours or less, 6 hours or less, 5 hours or less, 4 hours or less, 3 hours or less, 2 hours or less, or 1 hours or less. In certain embodiments, the step of applying an electric current between the composite electrode and the counter electrode can be conducted for 1-14 hours, 1-13 hours, 1-12 hours, 1-11 hours, 1-10 hours, 2-10 hours, 3-10 hours, 4-10 hours, 5-10 hours, 6-10 hours, 7-10 hours, or 8-10 hours.

Etching, including selective etching is well known and is widely used in industry for creating many products. Etching is typically performed by contacting a metal containing substrate with an etchant, such as an acid containing electrolyte solution.

Acids useful as etchants in the methods described herein include Bronsted-Lowry and Lewis acids, mineral acids, inorganic and organic acids, and combinations thereof. Specific examples of acids that can be used as the etchant in the methods described herein include, but are not limited to, perchloric, perchloroacetic, HCl, sulfuric, nitric, phosphorous acid, phosphoric acid, hypophosphorous acid sulfonics, methanesulfonic, ethanesulfonic, benzenesulfonic, toluenesulfonic, naphthanol sulfonic, camphor-10-sulfonic, 3-hydroxypropane-1-sulfonic, carboxylics, formic, acetic and citric acids. Halo-acids and halo-alcohols, such as trichloroethanol and trichloroacetic acid can also be used as the etchant.

Alternatively, a conjugate base of an acid, such as HCl or HBr (e.g., a salt comprising Cl or Br), can be used in conjunction in the presence of an acid (such as $H_2SO_4$ or $HSO_4^-$). Many organic and inorganic salts, such as calcium chloride, zinc chloride sodium chloride, magnesium chloride, salts of amines and acids, such as amine:hydrochlorides (e.g., triethanolamine:HCl), yltrimethylammonium bromide, benzyltributylammonium bromide, benzyldodecyldimethylammonium bromide, dimethyldioctadecylammonium bromide, dodecylethyldimethylammonium bromide, dodecyltrimethylammonium bromide, ethyltriphenylphosphonium bromide, ethylhexadec yldimethylammonium bromide, hexadecyltrimethylammonium bromide, myristyltrimethylammonium bromide, polybrene, poly(benzophenonetetracarboxylic dianhydride-ethidium bromide), tetraheptylammonium bromide, tetrakis(decyl) ammonium bromide, thonzonium bromide, and the like can be used.

In certain embodiments, the concentration of the acid in the electrolyte solution is between 0.1 to 3 M, 0.5 to 3 M, 1.0 to 2M, 0.5 to 2.5 M, 0.5 to 2 M, 0.5 to 1.5 M, 0.7 to 1.3 M, 0.8 to 1.2M, or 0.9 to 1.1 M. In certain embodiments, electrolyte solution comprises HCl.

In certain embodiments, the methods described herein are fluorine gas- and HF-free, i.e., the methods described herein do not call for the use of fluorine gas and HF or conjugate salts thereof.

The pH of the electrolyte solution can be 2 or less. In certain embodiments, the pH of the electrolyte solution is 1.5 or less, 1.0 or less, 0.5 or less, 0 or less, −0.3 or less, or −0.47 or less. In certain embodiments, the pH of the electrolyte is −0.5 to 0.0, −0.3 to 0.0, −0.3 to 1.0, −0.3 to 0.5, 0.0 to 0.5, or 0.0 to 1.0.

In certain embodiments, the method for preparing the MXene further comprises the step of purifying the MXene. The MXene can be purified using any conventional technique known in the art. Exemplary purification techniques include solid-liquid extraction, sonication, and the like. In certain embodiments, the MXene is subjected to solid-liquid extraction using water, an alcohol, and combinations thereof. Exemplary alcohols include methanol, ethanol, 1-propanol, 2-propanol, ethylene glycol, and mixtures thereof.

Synthesis of $Ti_2CT_x$ by E-Etching Composite Electrode $Ti_2CT_x$ was selected as the prototype to demonstrate the methods described herein since Ti-based systems have been prepared using a broad range of methods. The E-etching of $Ti_2AlC$ with $Cl^-$ etchant follows a two-stage mechanism for producing $Ti_2CT_x$ (FIG. 1a). Owing to the weaker Ti—Al bond than Ti—C bond, an applied voltage removes Al atoms first from layered carbides at stage 1; and then at stage 2, both Al and Ti atoms are etched until only monolayer carbon atoms are retained. The overall E-etching reaction on $Ti_2AlC$ is described as follows:

$$Ti_2AlC + yCl^- + (2x+z)H_2O \rightarrow Ti_2C(OH)_{2x}Cl_yO_z + Al^{3+} + (x+z)H_2 + (y+3)e^- \qquad (1)$$

Figure 6:
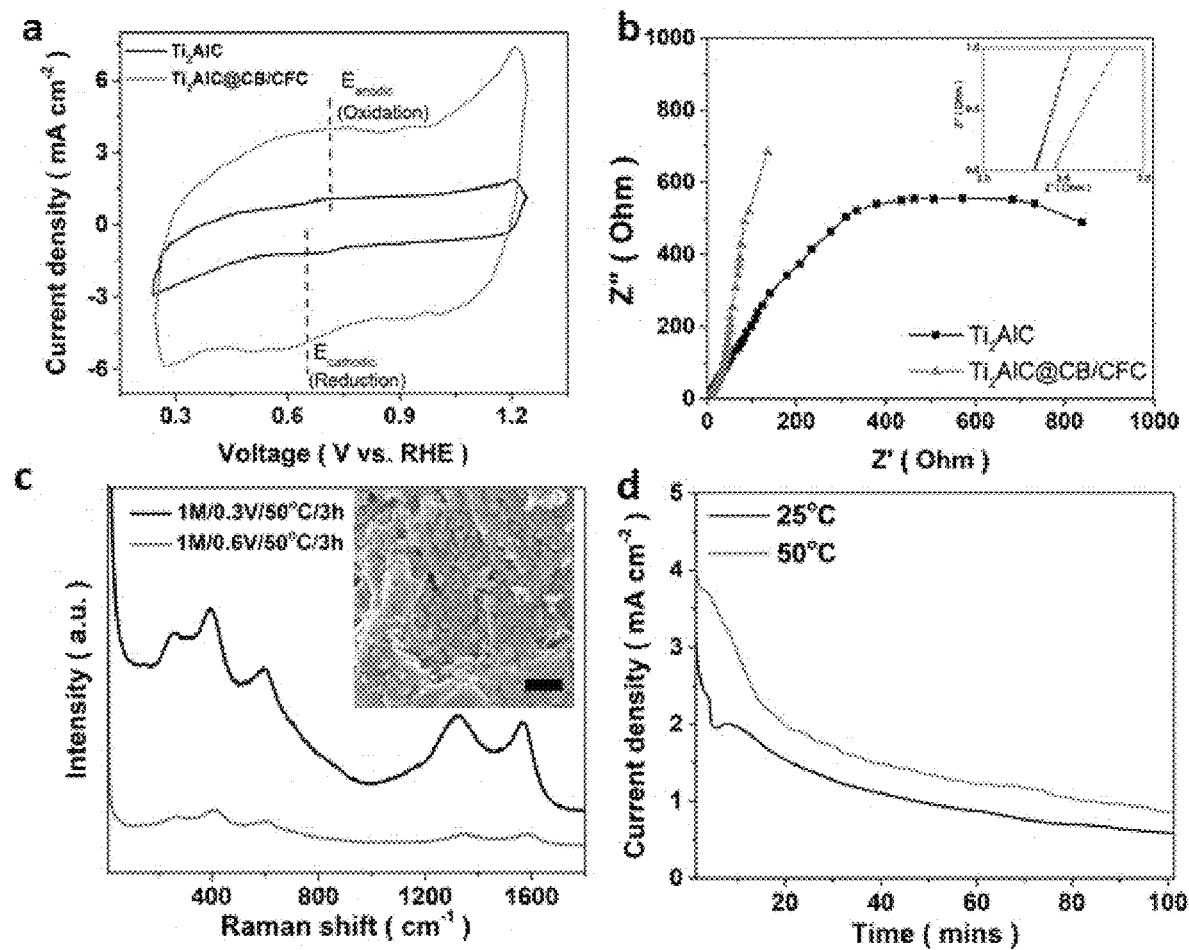
FIG. 6 depicts the effects of CB/CFC composite, temperature and etching voltage on E-etching $Ti_2AlC$ electrode. (a) Cycling voltammograms (CVs) with different $Ti_2AlC$ electrode combinations recorded at 20 mV/s scan rate and their (b) electrochemical impedance spectroscopy (EIS) measurements. (c) Raman spectrum of $Ti_2CT_x$@1M/50° C./3 h/0.6V or 0.3V (Inset: SEM image of $Ti_2CT_x$@1M/50° C./3 h/0.6V. The scale bar is 1 μm.). Over-etching issue was observed because of the presence of many etching-spots and fragment but much weaker Raman signals of the $Ti_2CT_x$ etched at a high voltage. (d) The potentio-static curve of 0.3V-etching of $Ti_2AlC$ in 1 M HCl solution at 25° C. and 50° C. for 100 min. Potentio-static curve of E-etching at 80° C. was not recorded due to unstable electrochemical signal at high temperature.

First, CFCs and CB were adopted to fabricate a composite electrode with $Ti_2AlC$, denoted as $Ti_2AlC@CB/CFC$. The introduction of CB/CFC composite generates larger current across the scanning voltage (FIG. 6) and the composite electrode exhibits low Warburg resistance, implying its important role in reducing ion diffusion resistance on electrolyte/electrode surface. It is thus suggested that the porous CFCs and highly conductive CB construct a 3D conductive network of $Ti_2AlC@CB/CFC$ to promote more efficient electrochemical reactions. The cyclic voltammogram (CV) is also important for determining a suitable range of etching voltages. Unfortunately, oxidation potentials of $Al^{3+}$ and $Ti^{3+}$ cannot be clearly distinguished from the broad band at 0.74 V vs RHE. In view of smaller oxidation potential of Al than that of Ti, a high voltage close to $Ti^{3+}$ oxidation potential (at 0.74 V vs RHE) provokes nonselective etching, associated with abundant etching-spots and fragments, but nearly non-observable Raman signals from 0.6 V-etched $Ti_2CT_x$ than the 0.3 V-etched one. Hence, 0.3 V vs. RHE was selected as the etching voltage in order to promote more selective removal of Al atoms (stage 1) and prevent over-etching. Second, etching of $Ti_2AlC$ is accelerated by gentle heating, where a greater current density of the E-etching system is obtained when the temperature is raised from 25 to 50° C. In stark contrast to the smooth surface of un-etched $Ti_2AlC$ (FIG. 1b), the small voltage and gentle heating give rise to delamination and rougher surface on $Ti_2CT_x$ (FIG. 1c-e). Such a morphological change is an indication of effective E-etching, particularly for the case with thermal effect. When the etching period is extended from 3 to 9 h, laminar structure can be successfully observed from $Ti_2CT_x@1$ M/50° C./9 h/0.3 V (FIG. 1e-g). It should be noted that CB facilitated E-etching on $Ti_2AlC$ to give better delamination than the CB-free samples under identical synthesis condition (FIG. 1c,d), reassuring the importance of CB/CFC composite in the efficient etching process.

Characterizations of $Ti_2CT_x$.

Figure 7:
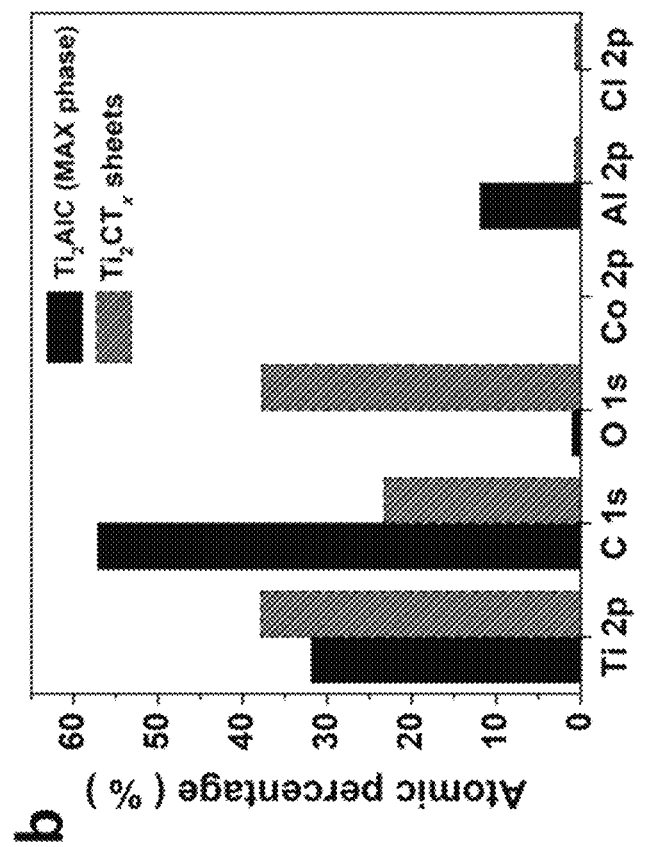
FIG. 7 depicts structural characterizations of $Ti_2CT_x@1M/50°$ C./9 h/0.3V. (a) Raman spectra, (b) XPS atomic percentage of $Ti_2CT_x$ and its MAX phase. XPS spectra of (c) Ti 2p, (d) C 1s, (e) O 1s, and (f) Al $2p_{3/2}$ (inset: Cl 2p), respectively.
Figure 7:
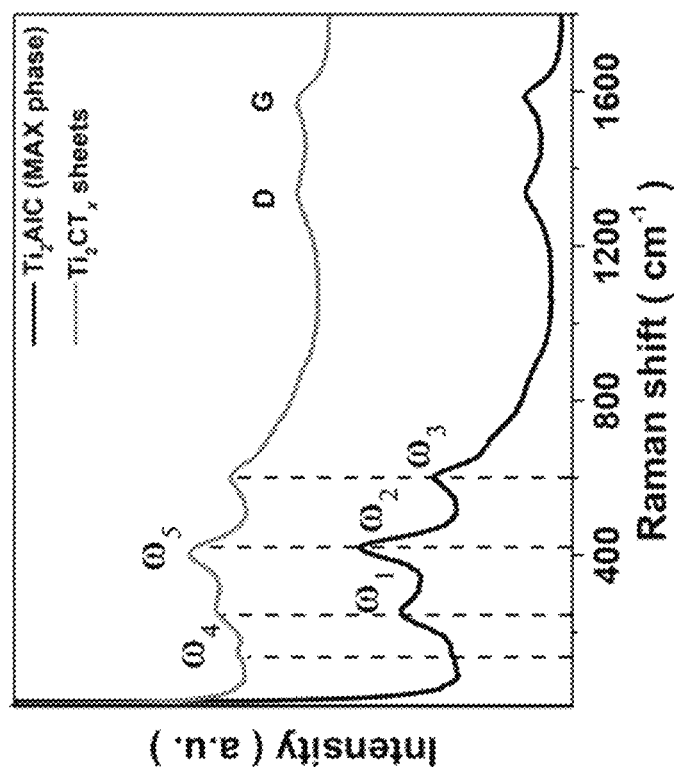
Figure 7:
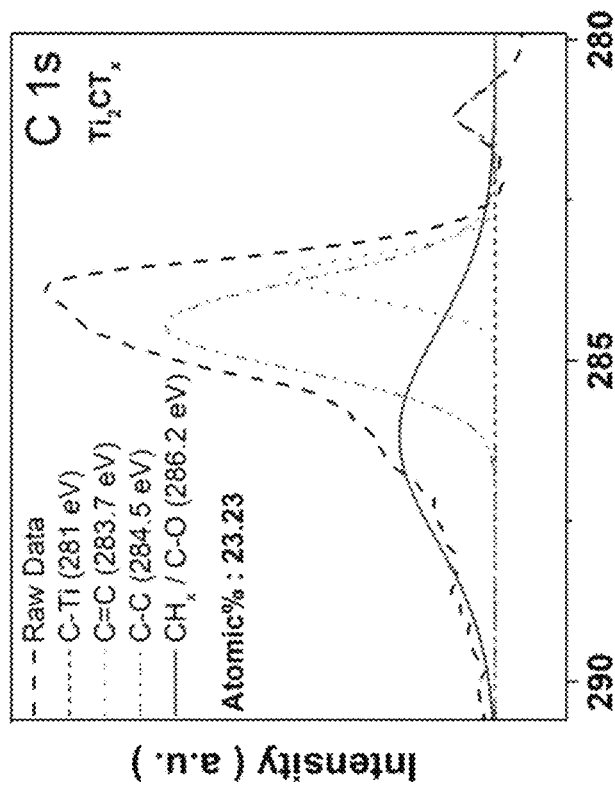
Figure 7:
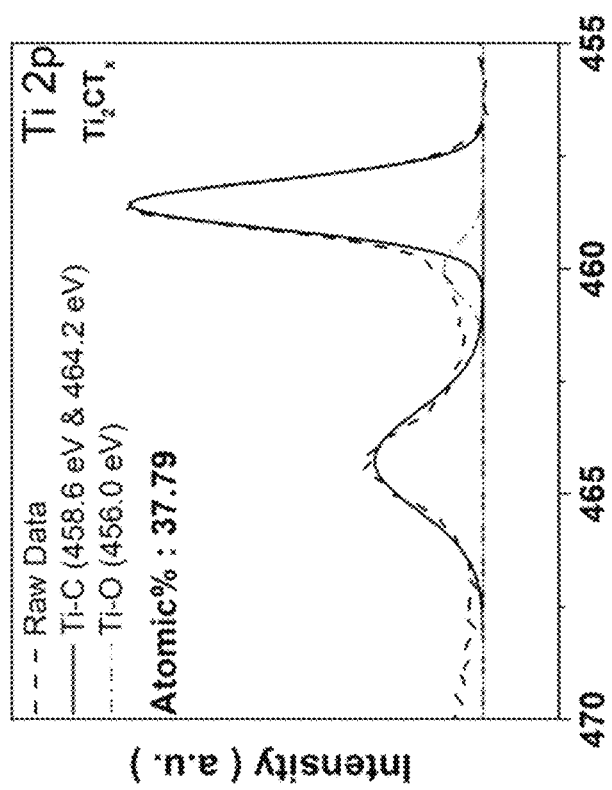
Figure 7:
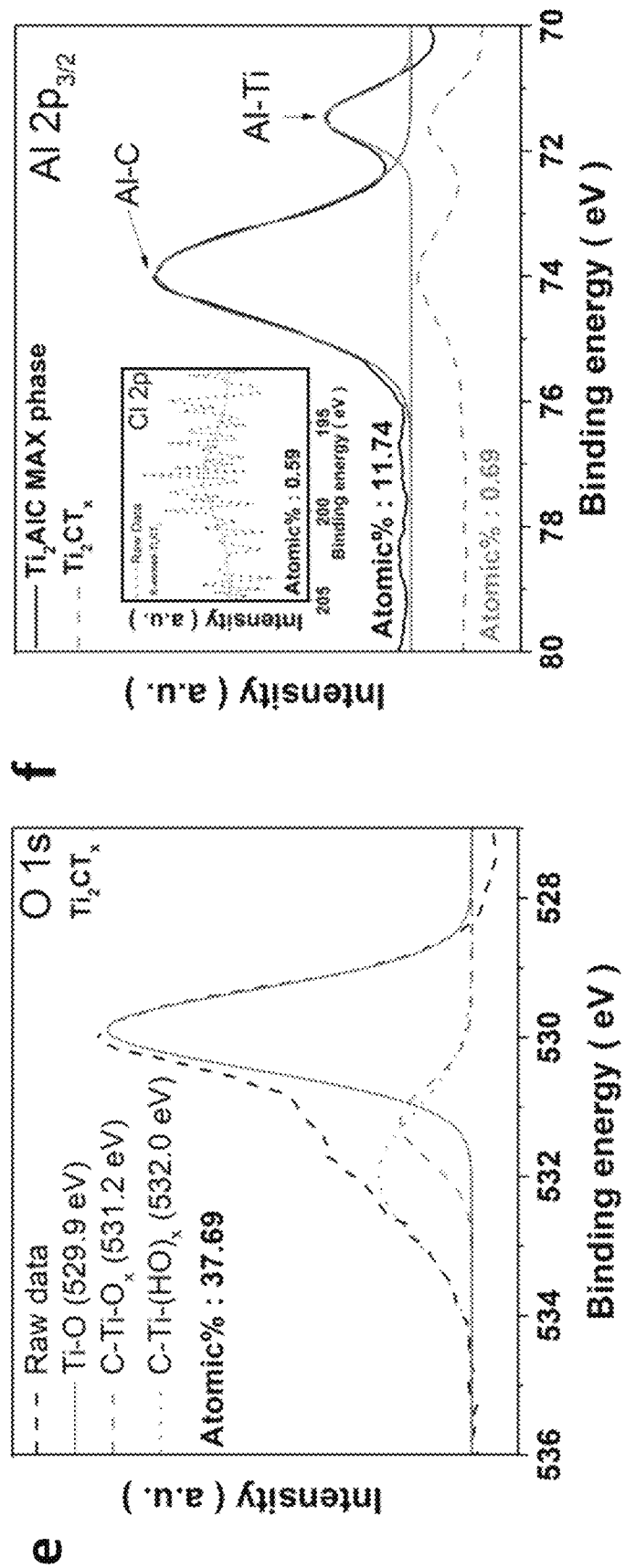
Figure 8:
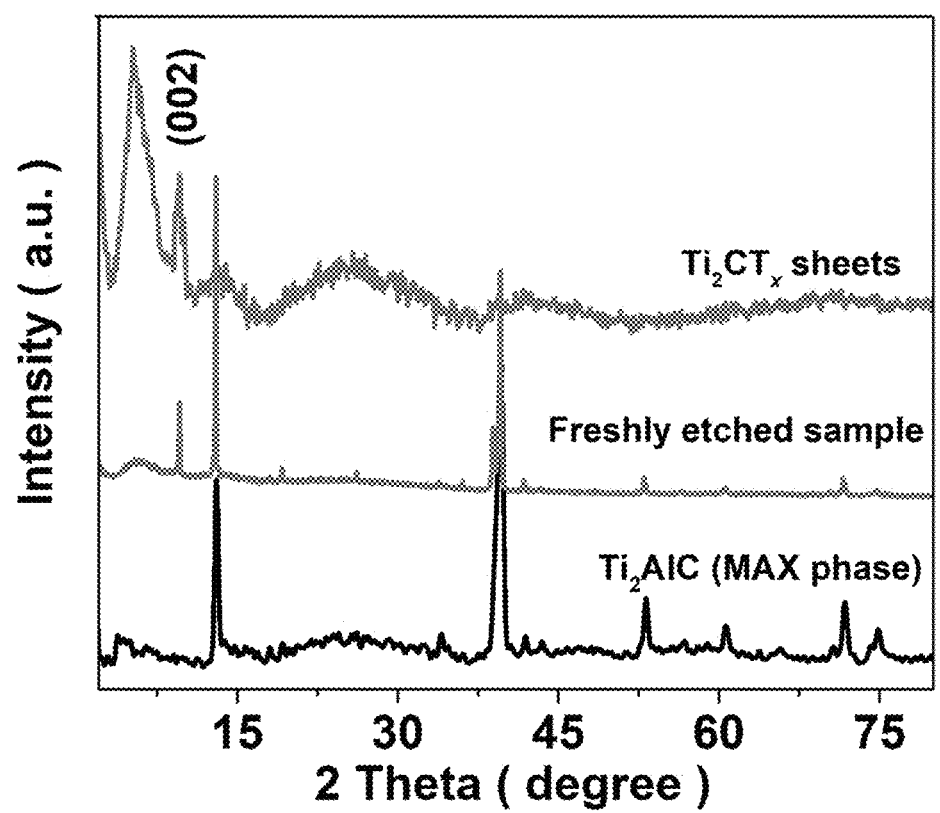
FIG. 8 depicts X-ray diffraction (XRD) investigation of Ti-based materials prepared in accordance with certain embodiments described herein. XRD patterns of $Ti_2AlC$, freshly E-etched $Ti_2AlC$ and $Ti_2CT_x$ sheets. The curves were normalized for comparison.
Figure 9:
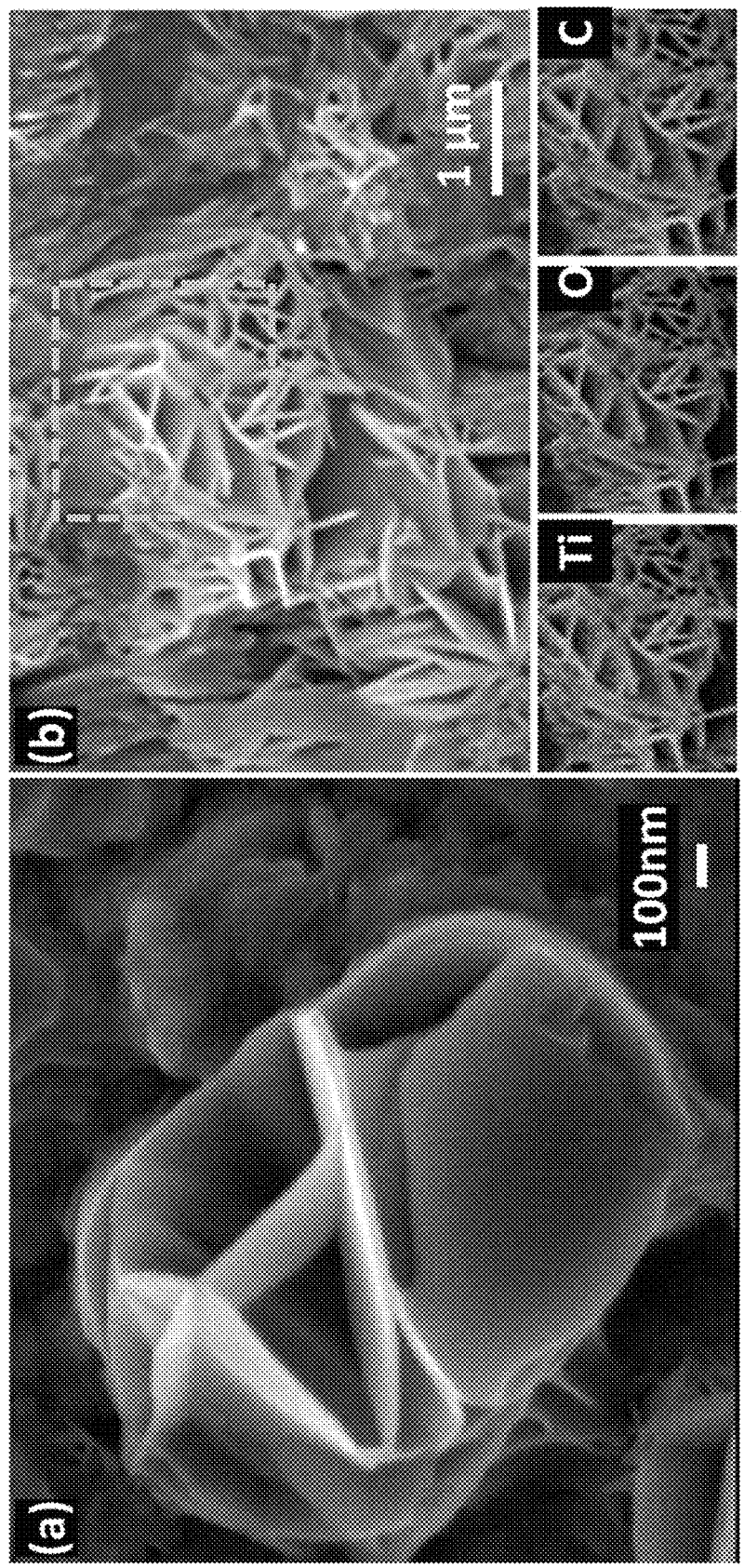
FIG. 9 depicts morphology and elemental analysis of $Ti_2CT_x$ sheets prepared in accordance with certain embodiments described herein. (a) High-magnification (×37,000) (b) low-magnification (×3,500) SEM images with the elemental mapping analysis of $Ti_2CT_x$ (inset).

The optimized MXene displays weaker Raman signals representative for $Ti_2AlC$ (FIG. 7), including the pair of vibrational peaks of nonstoichiometric titanium carbide ($\omega 1$ and $\omega 3$: ~250 and 600 $cm^{-1}$) and the vibrational peak of Al atoms in $Ti_2AlC$ ($\omega 2$: ~420 $cm^{-1}$). Notably, new peaks of $\omega 4$ and $\omega 5$ (~150 and 400 $cm^{-1}$) are observed due to the vibration of anatase phase $TiO_2$ and Ti atoms, respectively; while the retention of D and G broad bands indicates the presence of graphitic carbon on the sample surface. Atomic percentage of Al element was greatly reduced after the E-etching process (from 11.74% to 0.69%), suggesting the effective removal of Al atoms from $Ti_2AlC$. Regarding XPS analysis of the MXene, its Ti 2p spectrum shows a sharp peak for TiO (460 eV) and doublet peaks for Ti—C (464 and 455.7 eV). The C—C and $CH_x/C$—O species are confirmed by the XPS peak at 284.5 eV along with a shoulder peak at 286.2 eV in C1s spectrum. The $T_x$-related surface features are also manifested in the XPS measurements. A sharp peak at 281 eV is referred to C—Ti-$T_x$ bond, possibly arising from $Ti_2CO$, $Ti_2C(OH)_x$, and/or $Ti_2COH$—$H_2O$. Moreover, the band in O 1s spectrum is composed of three peaks attributed to the surface C—Ti—$(HO)_x$ (532.0 eV), C—Ti—$O_x$ (531.2 eV), and Ti—O (529.9 eV). It is noted that some Al element is still present in the $Ti_2CT_x$, featured with two prominent peaks at 73.96 and 71.47 eV due to the $2p_{3/2}$ orbit of $Al^{3+}$, but the Al content is low, as mentioned. However, the MXene displays an obvious upshift of (002) peak from 13.02° to 9.62° (FIG. 8), corresponding to an enlarged interlayer spacing (1.84 nm) compared to that of pristine $Ti_2AlC$ (1.36 nm). Noted that the 5.25° peak is due to the structural change in the crystal, probably from an ordered and multilayered MAX to a delaminated and swollen MXene. The SEM images in FIG. 9 reveal the ultrathin MXene sheets (with <100 nm thickness) assemble to a flower-like architecture on Zn substrate, suggesting the successful E-etching.

Extended Strategy to Synthesize $V_2CT_x$ and $Cr_2CT_x$.

Figure 10:
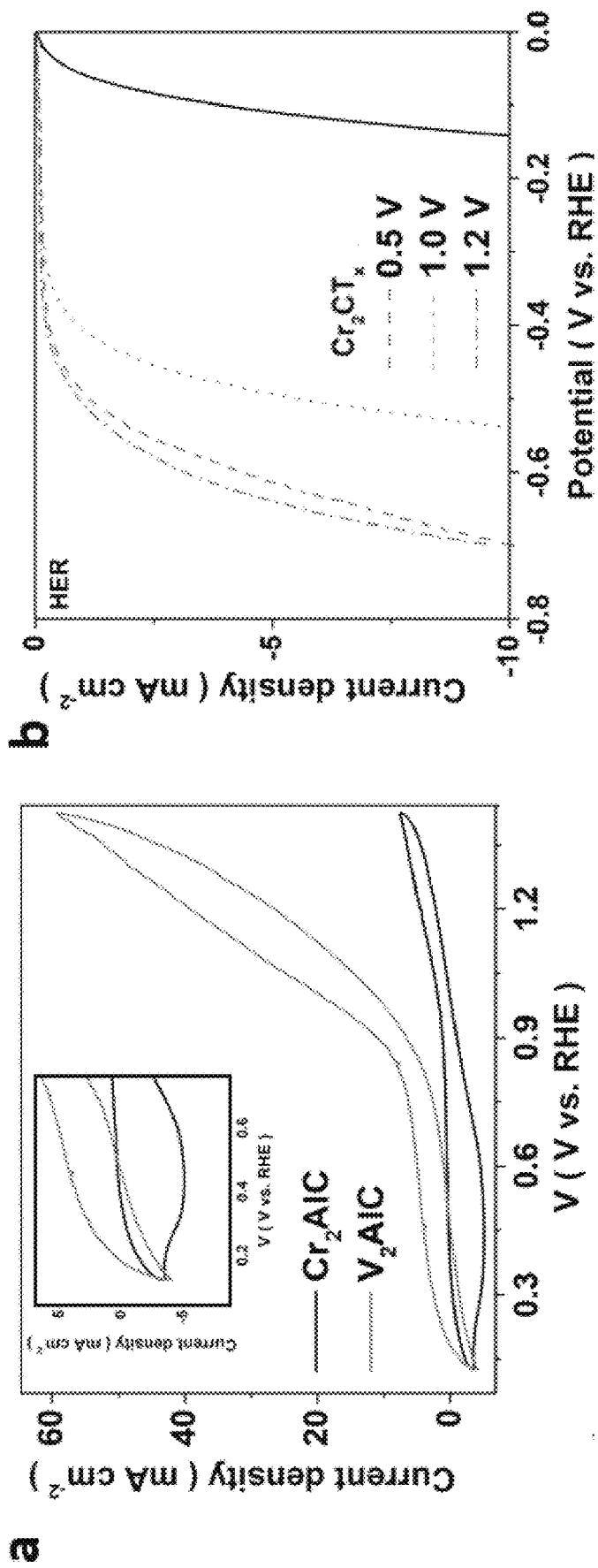
FIG. 10 depicts characterizations of V based and Cr-based materials prepared in accordance with certain embodiments described herein. (a) CVs for $V_2AlC$ and $Cr_2AlC$ as a working electrode in 1 M HCl electrolyte. LSV of (b) $Cr_2CT_x$ and (c) $V_2CT_x$ as working electrodes recorded at a scan rate of 5 mV/s in 1M KOH electrolyte. (d) XPS survey for MXenes. (e) Cr $2p_{1/2}$, Cr $2p_{3/2}$ and (f) V 2p XPS spectra of MXenes etched under optimized voltages.
Figure 10:
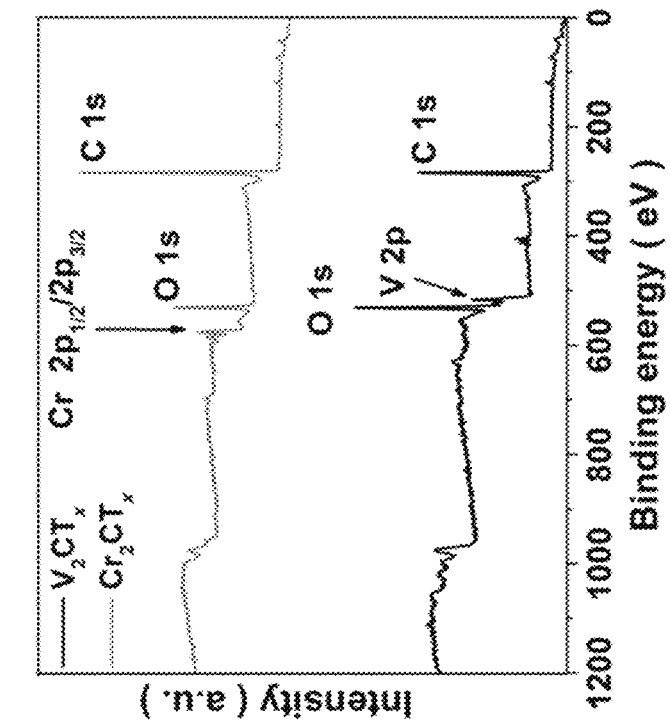
Figure 10:
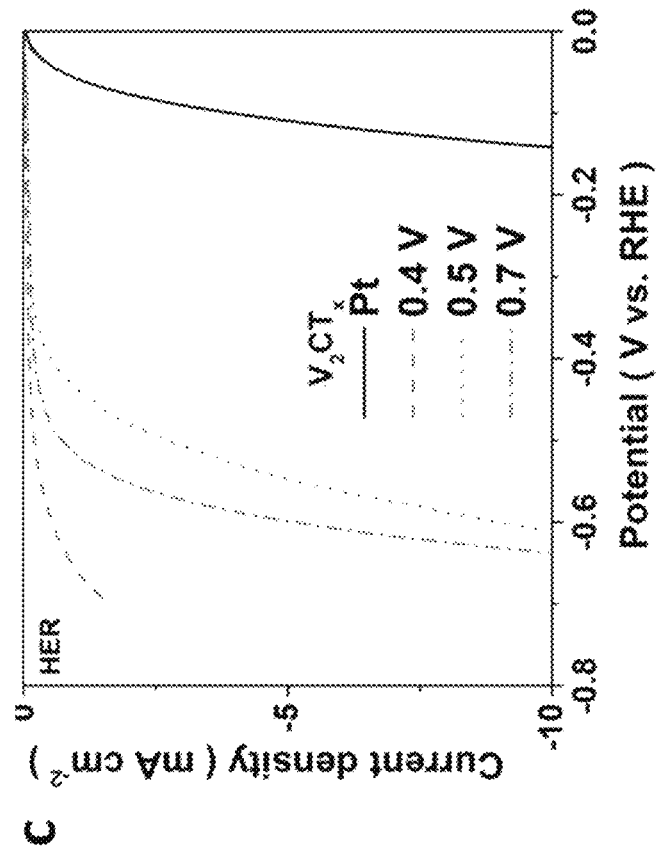
Figure 10:
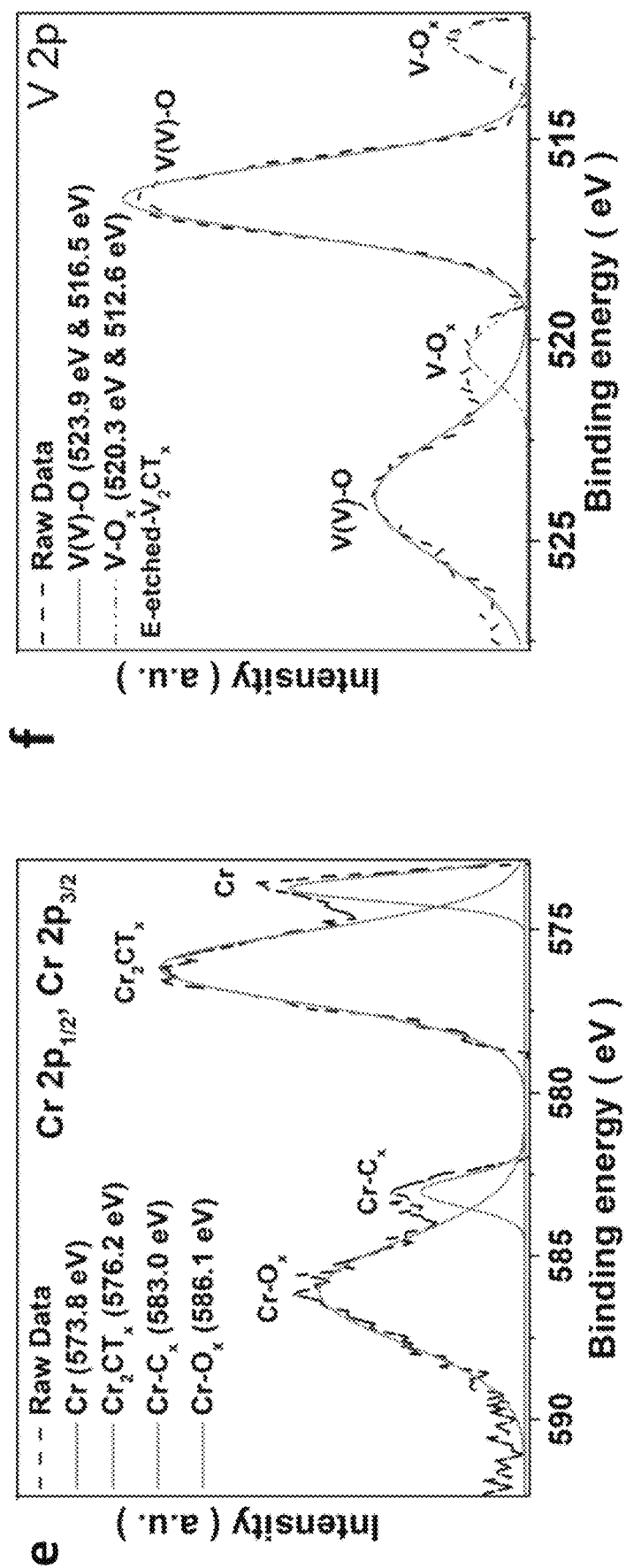

In fact, many compounds of MXenes are predicted as highly promising for energy-related applications. Still, there is a lack of studies on these compounds due to the great challenges in synthesis. In this regard, we attempted to explore this E-etching method as a universal way for preparing other MXenes. $V_2CT_x$ and $Cr_2CT_x$ were selected as representatives because they can hardly be synthesized at mild conditions and contain the same period of M as Ti. Thereby, despite its theoretically low free energy of H adsorption at equilibrium coverage, $Cr_2CT_x$ is left as a theoretical compound until now. Since M-Al and M-C bonds have different strength, CV measurements were essentially conducted to determine etching voltages for each MXene. Unlike the broad CV peak of $Ti_2AlC$, the plateaus corresponding to Al removal can be identified, at 0.4-0.7 V for $V_2AlC$ and 0.6-1.0 V for $Cr_2AlC$ (FIG. 10).

Under fixed etching conditions (i.e., 1 M/50° C./9 h) but various voltages, higher M/Al and M/O ratios (M=Cr, V) (Table 1) are result from 0.5 V-etched $V_2CT_x$ and 1.0 V-etched $Cr_2CT_x$, respectively, indicating more selective etching at these two optimized voltages. As no reports are available for these E-etched MXenes, we attempted to further optimize the etching voltages based on their HER performance, which concretely reveals their quality. In line with the EDX analysis, $V_2CT_x$ and $Cr_2CT_x$ derived from the corresponding optimized etching voltages demonstrated the best HER performance. The results also imply that MAX materials with heavier M elements (Cr>V>Ti) require tougher etching conditions to synthesize MXene due to stronger M-Al bond, which is in accord with those using HF-etching.

TABLE 1

Quantitative EDX results with different etching voltage.

| Material | Etching Voltage (V) | M* | Al | Atomic % O | C | M/Al |
|---|---|---|---|---|---|---|
| $Cr_2CT_x$ | 0.5 | 35.18 | 18.16 | 5.93 | 40.73 | 1.93 |
|  | 1 | 29.25 | 12.15 | 1.21 | 56.85 | 2.4 |
|  | 1.2 | 29.64 | 14.45 | 3.93 | 51.98 | 2.05 |
| $V_2CT_x$ | 0.4 | 10.84 | 3.55 | 4.2 | 81.41 | 3.05 |
|  | 0.5 | 30.62 | 7.84 | 30.84 | 30.7 | 3.905 |
|  | 0.7 | 34.72 | 14.52 | 23.01 | 27.75 | 2.39 |

M* = Cr and V.

Figure 2:
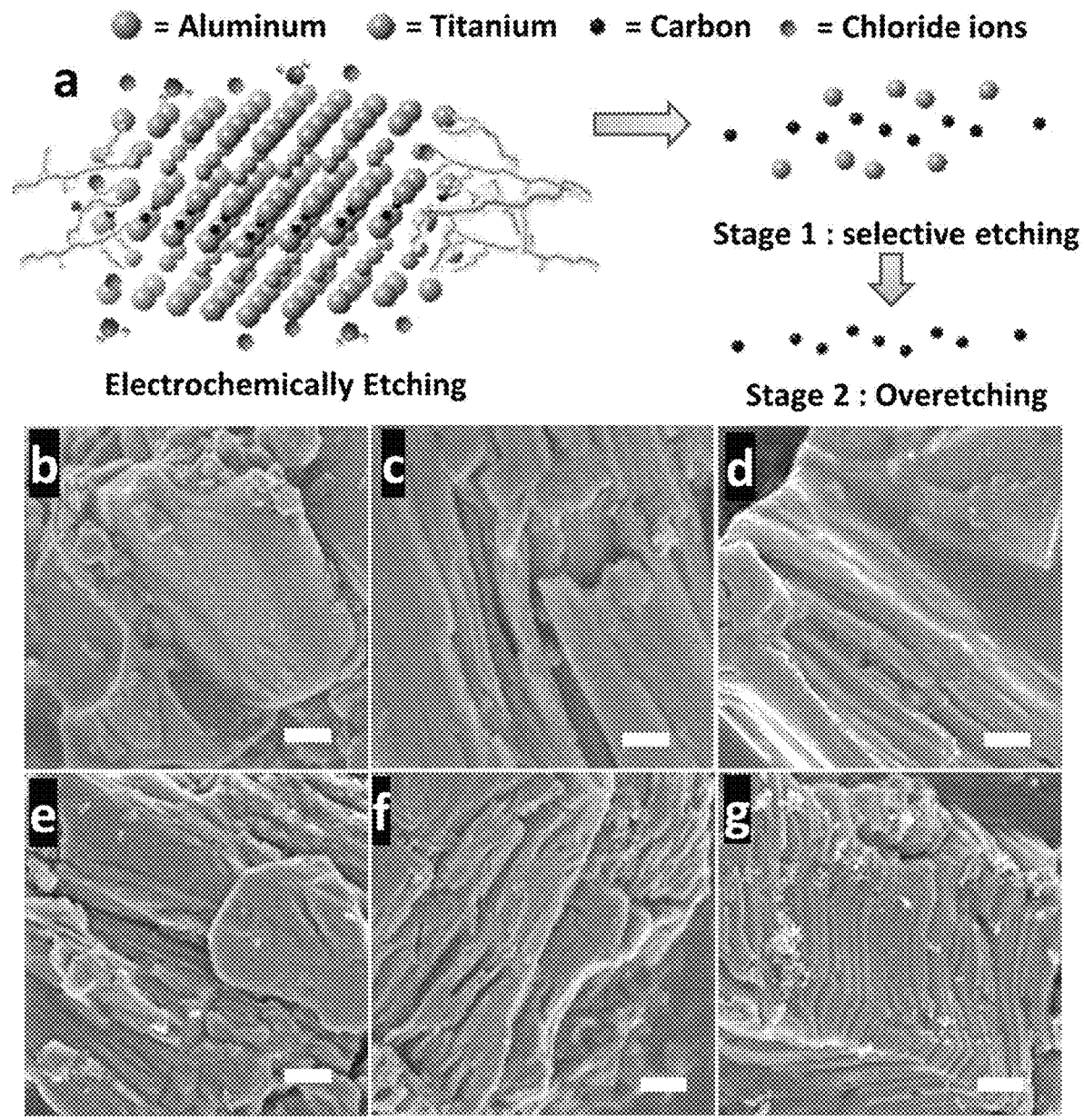
FIG. 2 depicts a pictorial E-etching mechanism and morphological studies of $Ti_2CT_x$. (a) Proposed E-etching mechanism of $Ti_2AlC$ in HCl electrolyte. Scanning electron microscopy (SEM) images of $Ti_2CT_x$ produced from different E-etching conditions ([HCl]/temperature/time/voltage). (b) Unetched $Ti_2AlC$, (c) 1M/25° C./9 h/0.3V, (d) 1M/50° C./3 h/0.3V without CB, (e) 1M/50° C./3 h/0.3V, (f) 1M/50° C./6 h/0.3V, and (g) 1M/50° C./9 h/0.3V. The scale bars are 1 μm.
Figure 11:
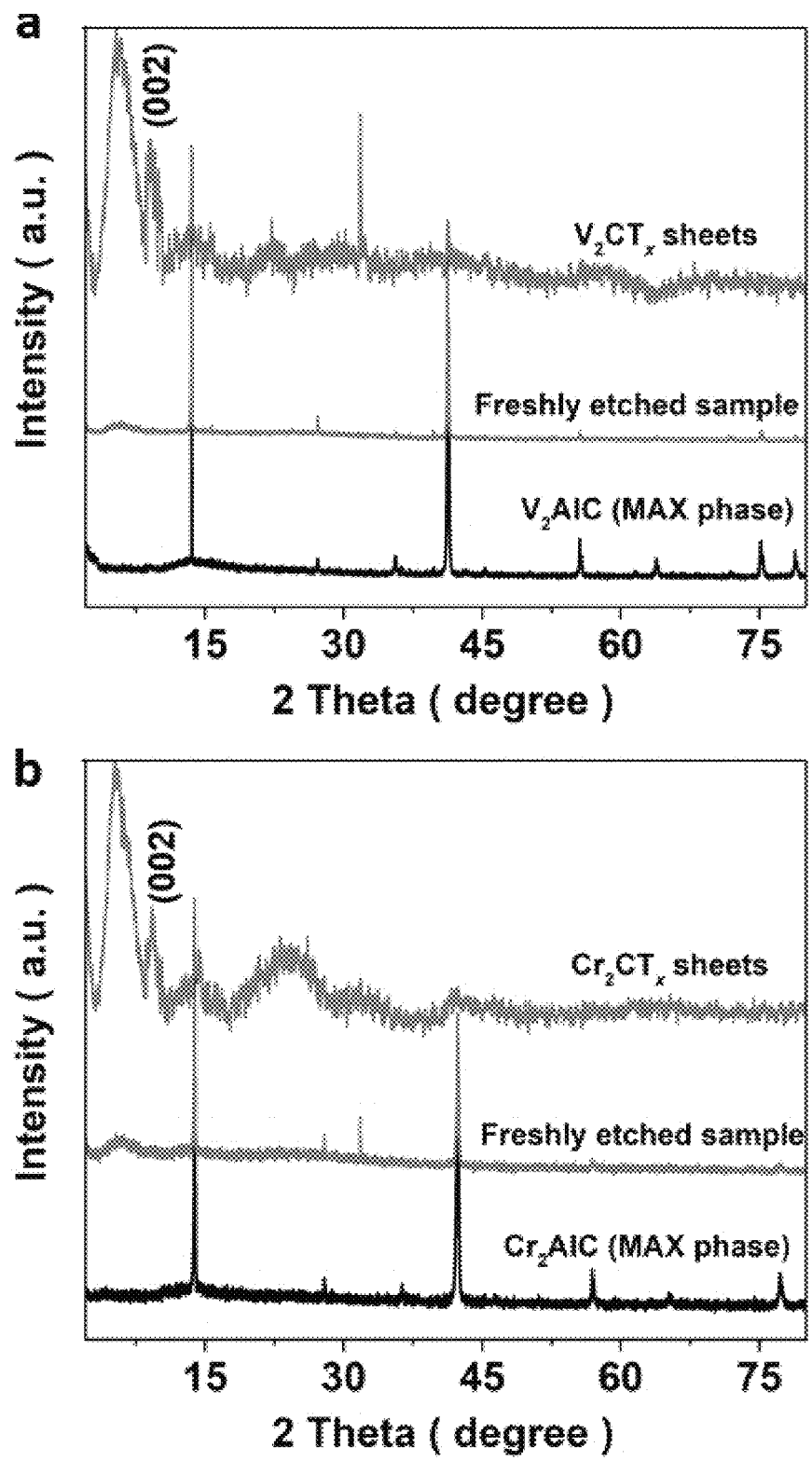
FIG. 11 depicts an XRD investigation of V-based and Cr-based materials prepared in accordance with certain embodiments described herein. (a) XRD patterns of $V_2AlC$, freshly F-etched $V_2AlC$ and $V_2CT_x$ sheets. (b) XRD patterns of $Cr_2AlC$, freshly E-etched $Cr_2AlC$ and $Cr_2CT_x$ sheets. The curves were normalized for comparison.
Figure 12:
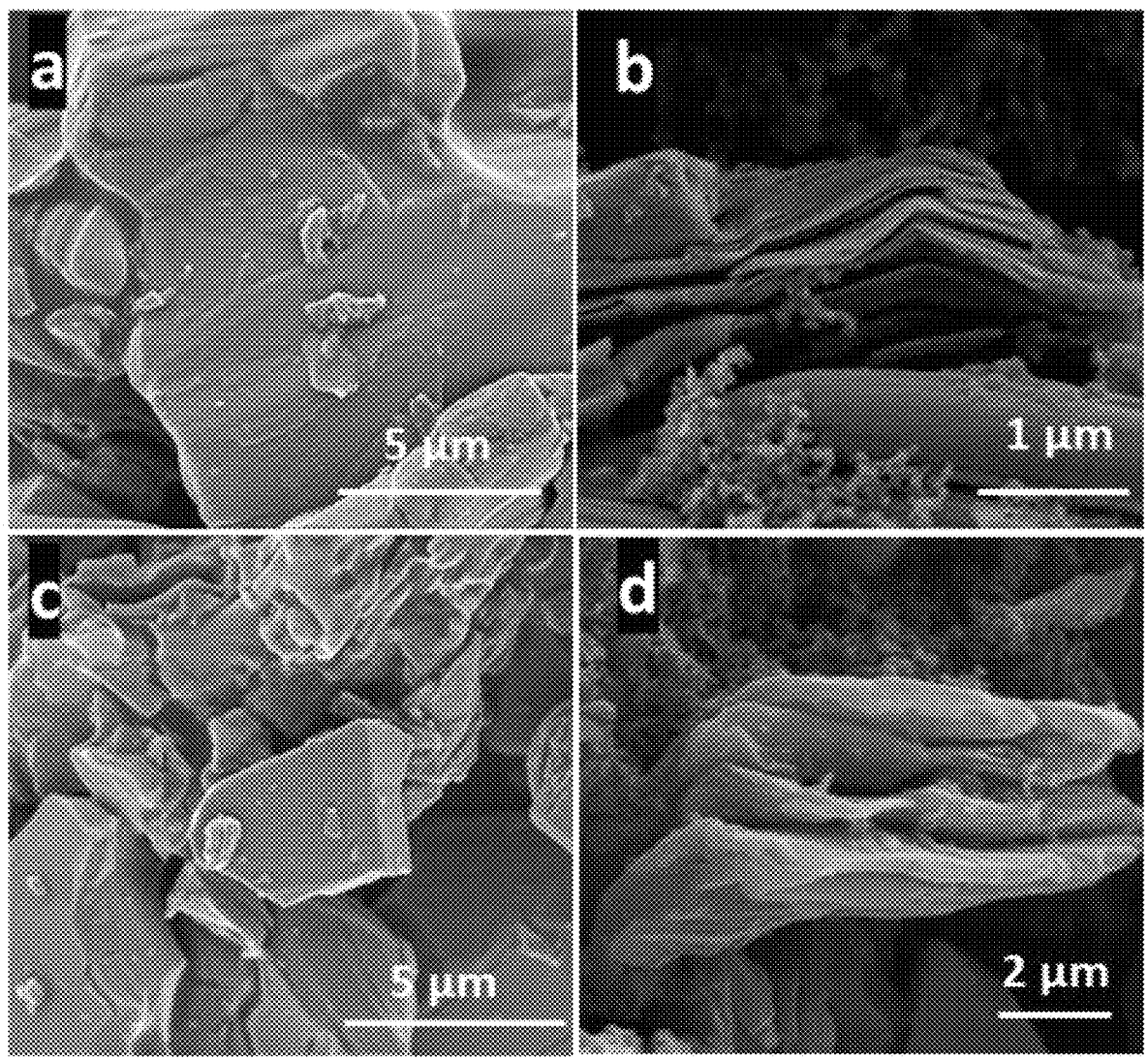
FIG. 12 depicts morphology analysis on V-based and Cr-based materials. SEM images of (a) $Cr_2AlC$, (b) freshly etched $Cr_2CT_x$ (c) $V_2AlC$ and (d) freshly etched $V_2CT_x$, respectively. The delamination was clearly found on the freshly etched samples.
Figure 13:
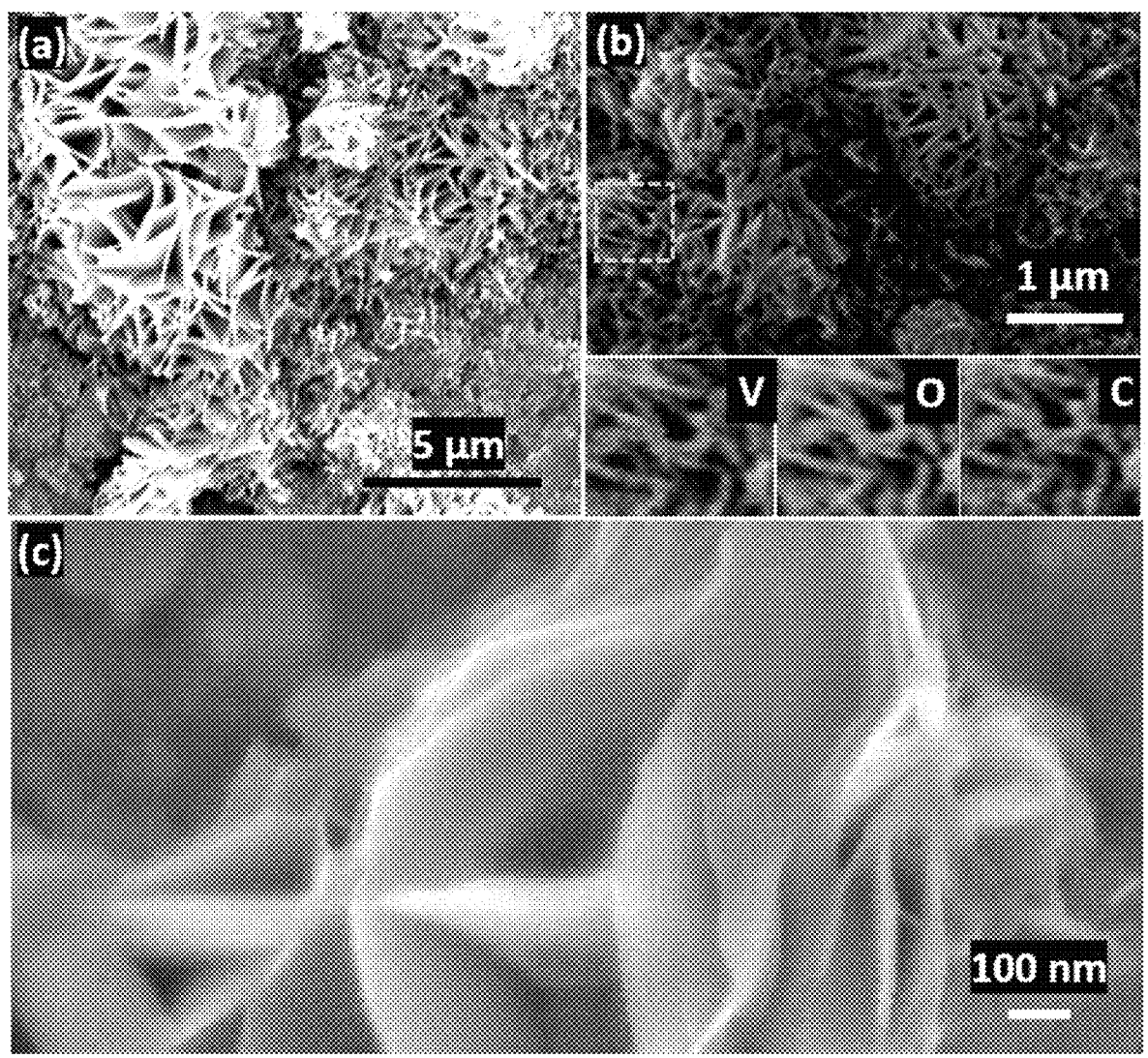
FIG. 13 depicts morphology and elemental analysis (inset) of $V_2CT_x$ sheets prepared in accordance with certain embodiments described herein. (a, b) Low-magnification (×3500) SEM images and the elemental mapping analysis of $V_2CT_x$. (c) High-magnification (×37000) SEM image shows the thickness of the sheets is less than 100 nm.
Figure 14:
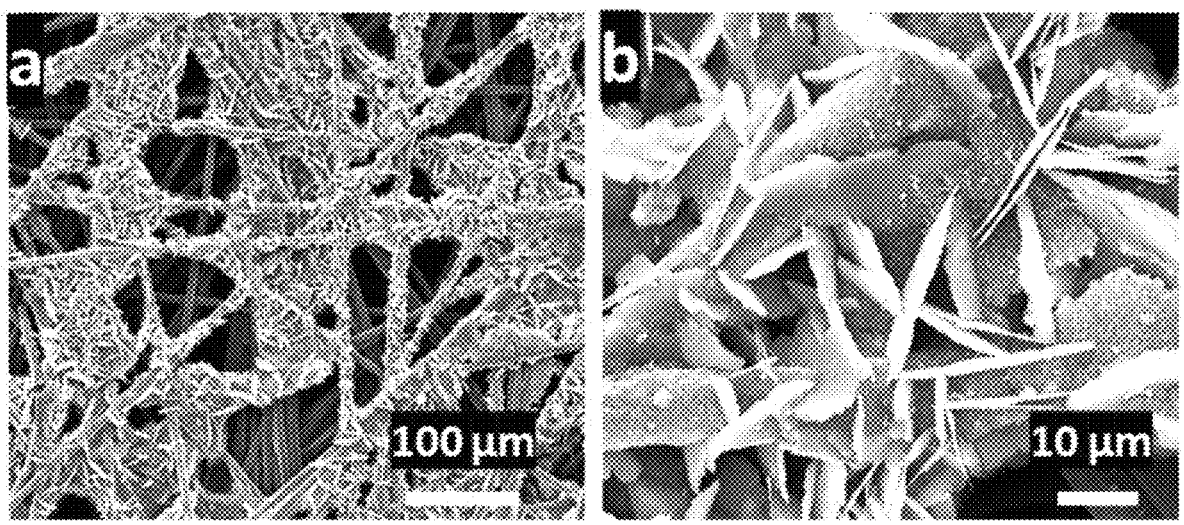
FIG. 14 depicts a substrate-derived assembly of MXene sheets prepared in accordance with certain embodiments described herein. (a, b) SEM images of $Cr_2CT_x$ sheets on carbon papers. SEM image demonstrated the MXene sheets formed a network on the carbon paper. The lateral size of large flakes reaches up to ~25 μm.

To verify the successful synthesis of $Cr_2CT_x$ and $V_2CT_x$, a series of characterizations were conducted. Effective Al removal on the MAX precursors is suggested based on the vanished XPS peak at 79 eV after E-etching process. Moreover, the characteristic XPS peaks for MXenes are found from $Cr_2CT_x$ (576 eV for chromium oxide) and $V_2CT_x$ (523 eV for vanadium oxides), with the presence of surface functional groups (—O/—OH). Similar to the E-etched $Ti_2CT_x$ as discussed above, the $Cr_2CT_x$ and $V_2CT_x$ feature an upshift of (002) XRD peak from ~13° to 9.14° and 9.29°, respectively, in addition to the peak at ~5.25° induced from the material delamination after etching (FIG. 11). Notably, the freshly etched MXenes are of accordion-like structure, in stark contrast to the smooth MAX materials (FIG. 12). Upon the sonication-assisted liquid exfoliation and purification, the compact-layered MXenes separate to a wealth of sheets with a lateral size of >1 μm and thickness of ~5-80 nm, which assemble to flower-like architecture as the E-etched $Ti_2CT_x$ (FIG. 2). The MXene flakes evenly present essential elementals including V/Cr, C, and O on their surfaces. Worth-noting is that the exfoliated-$Cr_2CT_x$ sheets are very flexible to spread onto carbon fibers (FIG. 14), on which some large flakes (lateral size up to 25 μm) can actually be found. This phenomenon may propose that the E-etched MXene flakes have substrate-driven architectures and benefit to form various 3D composites. Although the MXene sheets are well-dispersed in water owing to their small size and hydrophilic surface groups (inset of FIG. 2b), the polydisperse size of MXenes can be further improved or tailored by chemically slicing or sonicating the MAX materials (~1-30 μm) to prepare desirable 3D composites. The overall product yield was estimated as ~50% based on the weight ratio of 2D MXenes to the pristine MAX precursor. Although the produce yield can be slightly higher than that of HF-etched MXenes (~40%), some residue MAX precursors are inevitably retained in the E-etched MXenes owing to their low reactivity toward etching. It should be pointed out that the product yield of our E-etching strategy can rationally be improved by recycling the sediments, where the conversion rate from MAX-phase material to MXene can reach up to ~75% because of the increased contact area with the CB/CFC 3D structure for etching. This measure is more difficult to be implemented to the case of aggressive and highly toxic HF-etching. Hence, this E-etching method may emerge as a safer, efficient, and universal way to synthesize various compounds of MXenes at large scale.

Electrocatalytic Performance of MXenes for HER and the Mechanism Investigation.

Figure 15:
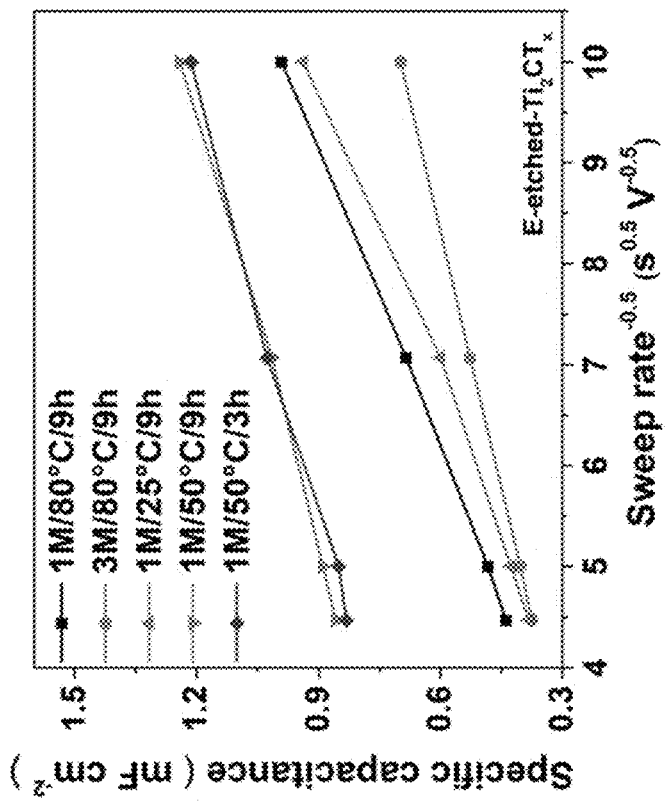
FIG. 15 depicts HER activities and mechanism studies of $Ti_2CT_x$ prepared in accordance with certain embodiments described herein. (a) Tafel slopes of $Ti_2CT_x$ catalysts produced from different etching conditions. (b) The specific capacitance plot against $v^{-0.5}$ (50, 40, 20 and 10 mV/s) of various $Ti_2CT_x$. SEM images of $Ti_2CT_x$ produced from different etching [HCl], (c) 1M/80° C./9 h/0.3V and (d) 3M/80° C./9 h/0.3V. The scale bars are 1 μm. (e) The anodic-going IR corrected LSV of $Ti_2CT_x@1$, 2 or 3 M/80° C./9 h/0.3V (inset: linear relationship between $\eta@J_s$ and [HCl]) and (f) the corresponding Raman spectra. (g) LSV of $Ti_2CT_x$ prepared from 1 M HCl but different etching time and temperature and (h) the corresponding Raman spectra.
Figure 15:
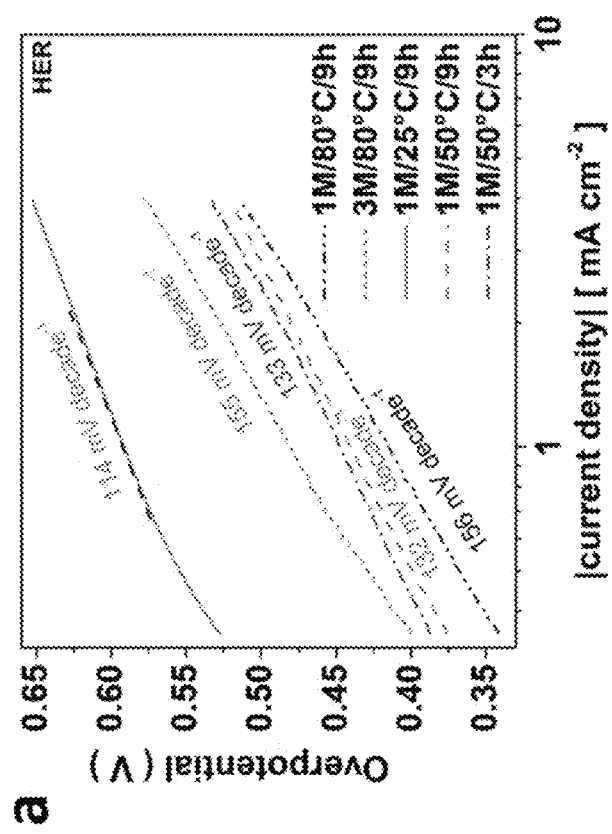
Figure 15:
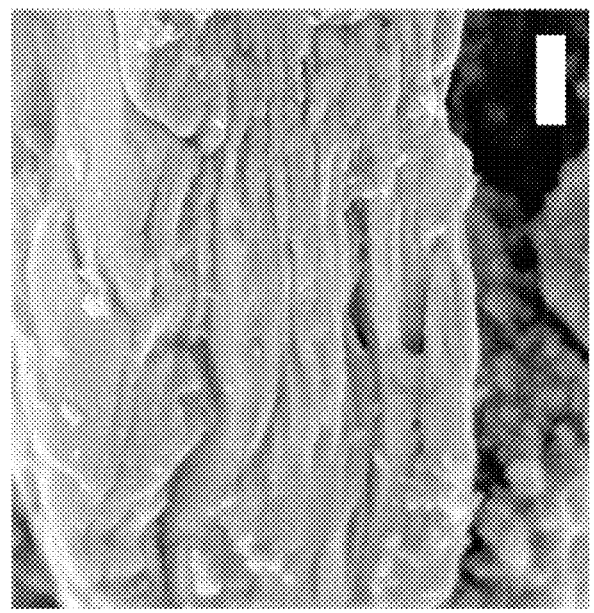
Figure 15:
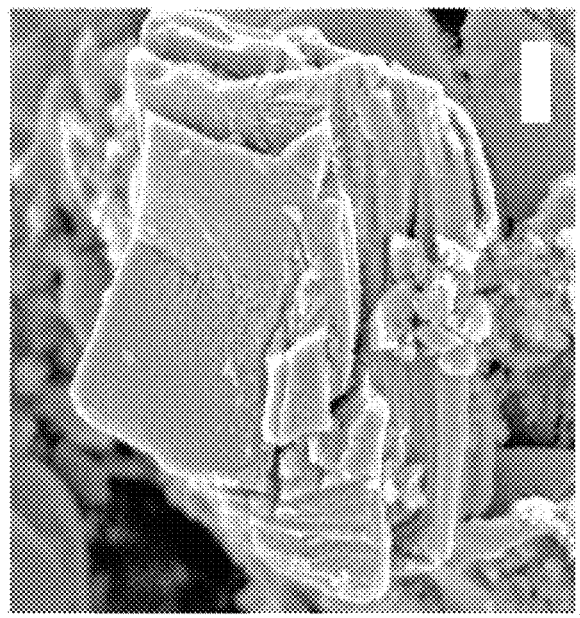
Figure 15:
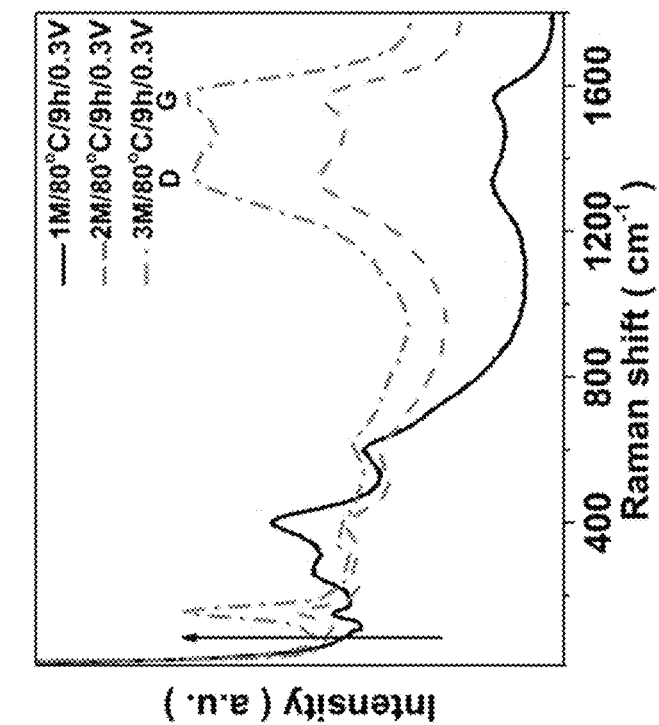
Figure 15:
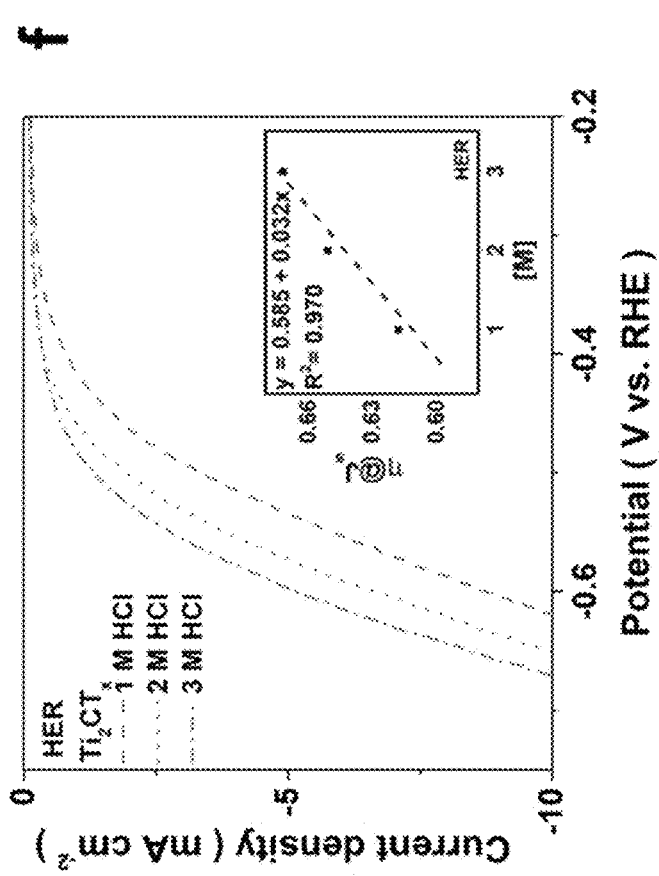
Figure 15:
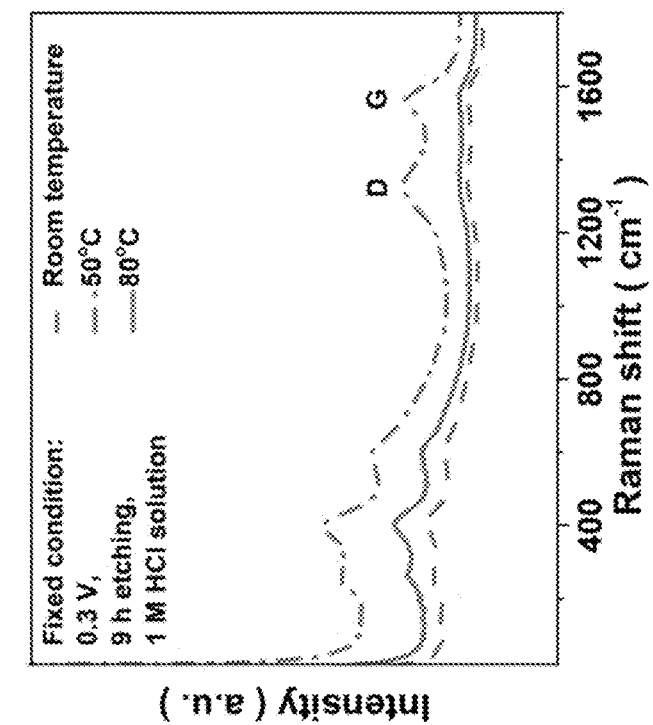
Figure 15:
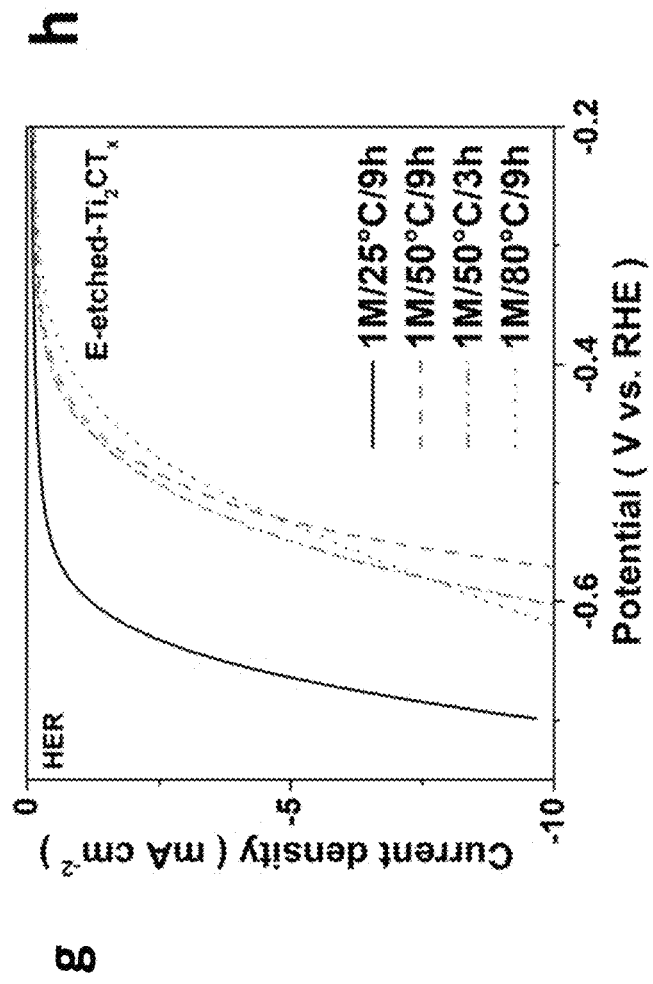

Despite the rise of MXene based electrocatalysts for water-splitting due to their high robustness, active surface, and large interspacing, there are limited reports about the electrocatalytic performance of MXenes synthesized from E-etching. It is found that HER occurs through the Volmer-Heyrovsky reaction rather than Tafel reaction on all the E-etched MXenes because of large Tafel slopes (FIG. 15). In this case, the activation energy of HER is sensitive to H coverage and $H_3O^+/e^-$ concentration on the double layer (solid/liquid interface). These two factors closely correlate to diffusion-controlled ($C_{dif}$) and capacitive ($C_{cap}$) capacitance, while the latter is a common indicator for the electrochemical active surface area (ECSA) of a catalyst. In view of such surface-dependent catalytic property, HER performance can reveal the MXene quality. Accordingly, etching effects ([HCl], temperature, and time) on the $Ti_2CT_x$ and their HER catalytic performance were examined in a three-electrode configuration.

Figure 3:
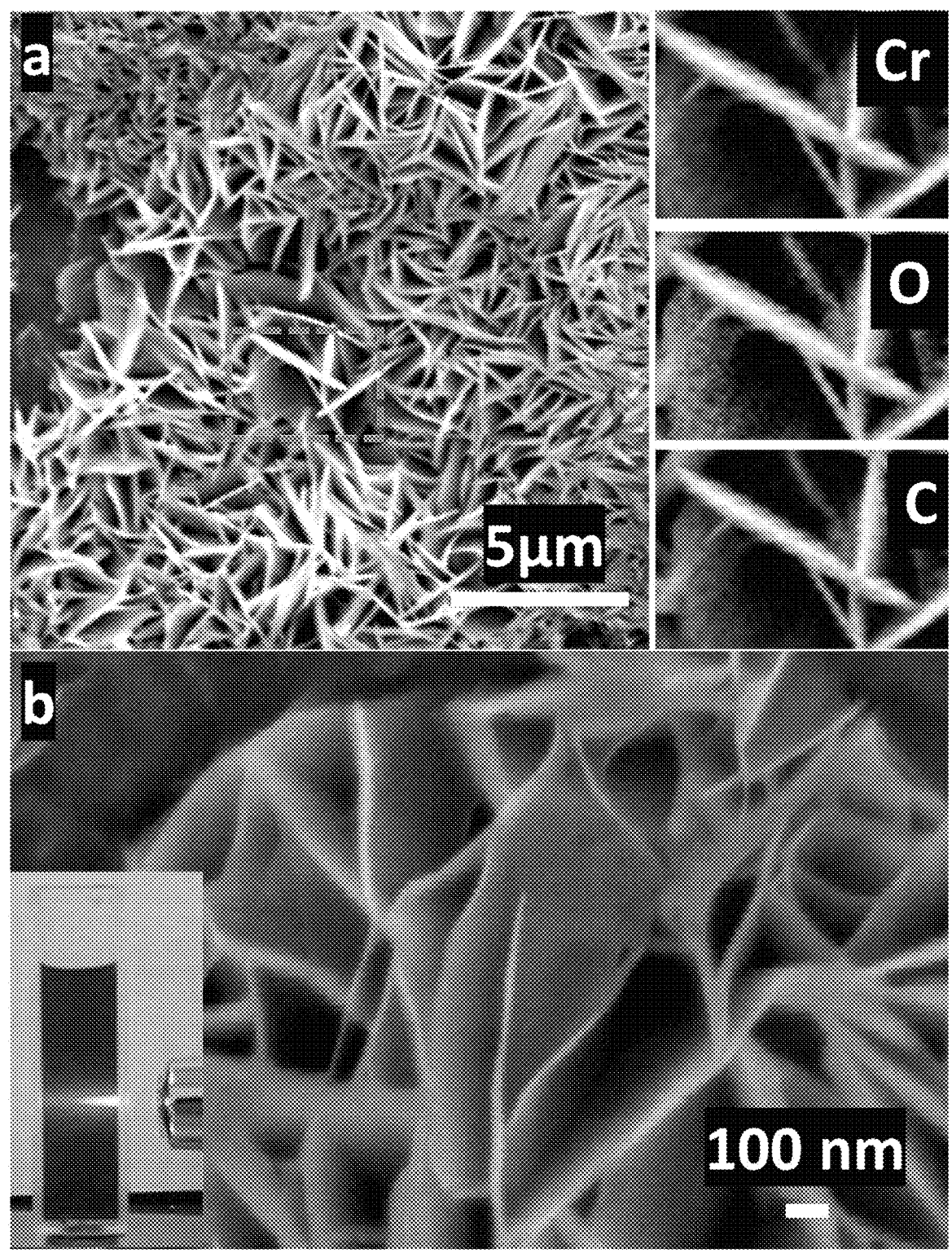
FIG. 3 depicts (a) Low-magnification and (b) high-magnification SEM images with the elemental mapping analysis of $Cr_2CT_x$ (Inset: digital photo of $Cr_2CT_x$ well-dispersed in water demonstrating a clear Tyndall scattering effect).
Figure 16:
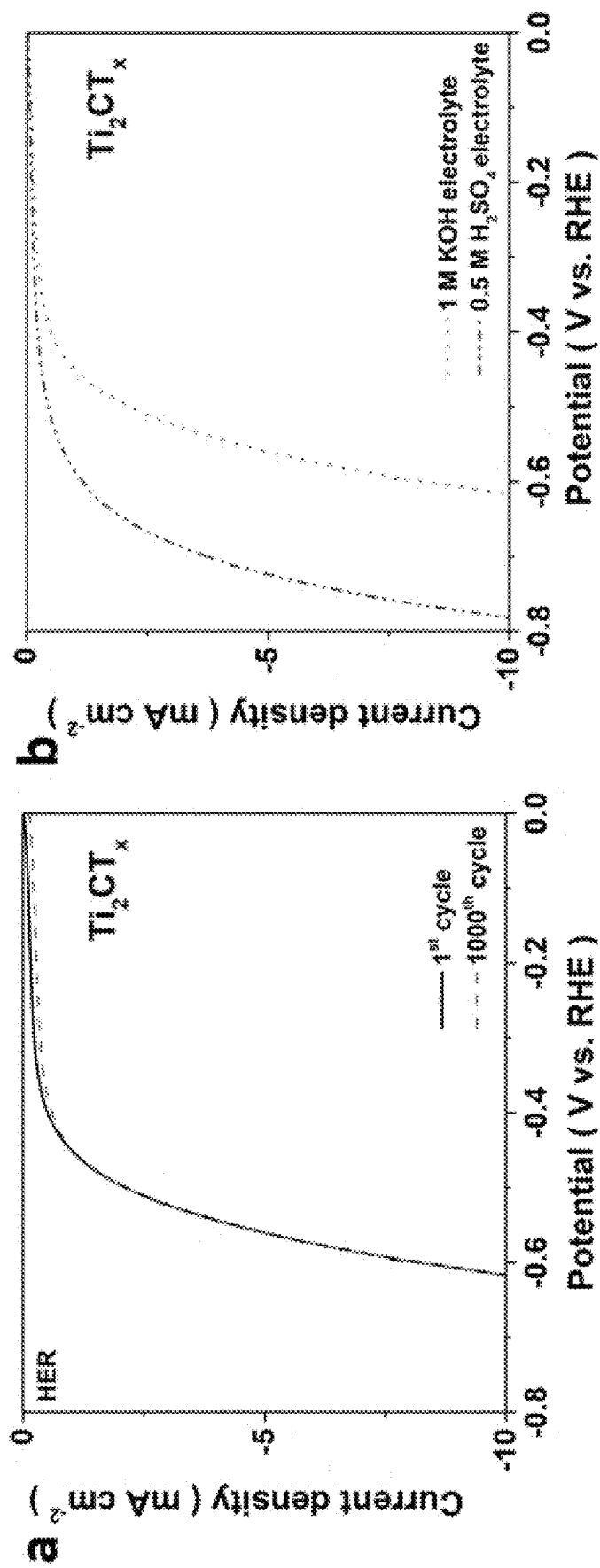
FIG. 16 depicts hydrogen evolution reaction (HER)/oxygen evolution reaction (OER) performance of MXenes prepared in accordance with certain embodiments described herein when used as a bifunctional electrocatalysts. The IR-corrected LSVs for $Ti_2CT_x$ as a working electrode (a) upon 1000 cycles and (b) that performed in 0.5 M $H_2SO_4$ and 1 M KOH electrolytes, respectively. Tafel plots of $Co^{3+}$-decorated-MXenes for (c) OER and (d) HER activity, respectively. LSV of $Co^{3+}$-$Ti_2CT_x$ before and after 1000 CV cycles for (e) HER and (f) OER.
Figure 16:
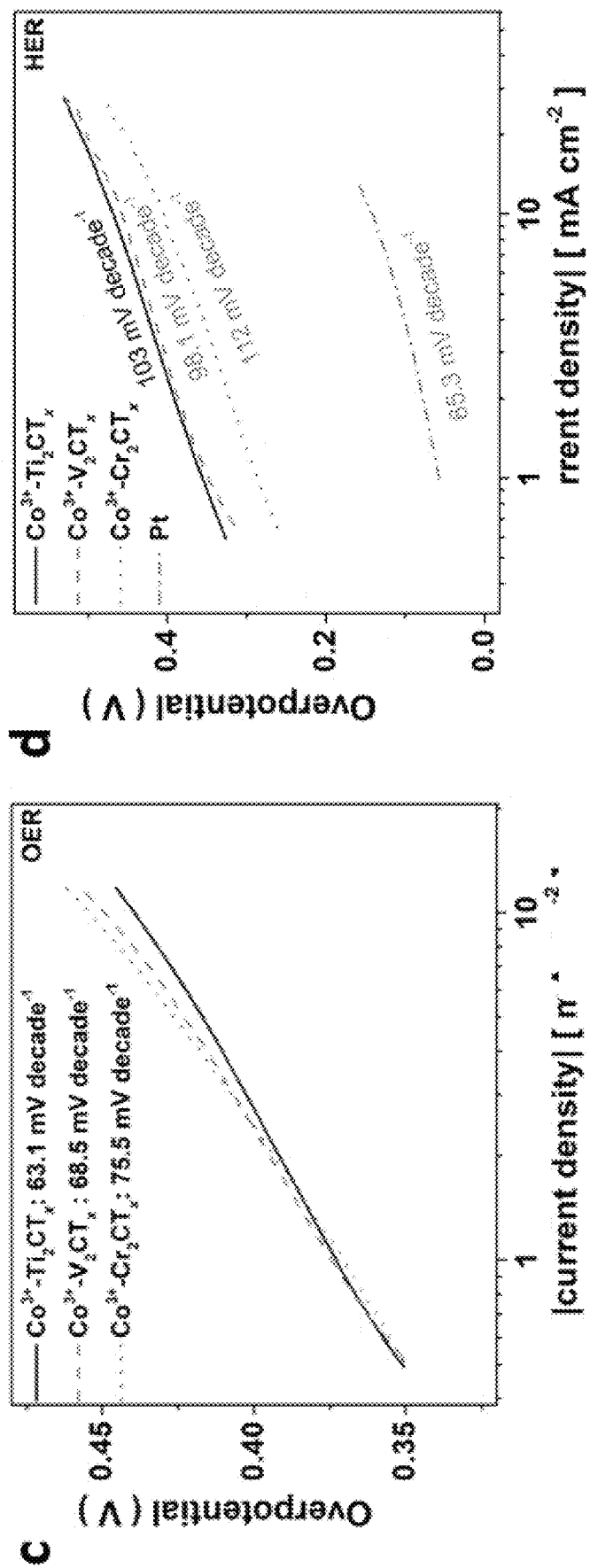
Figure 16:
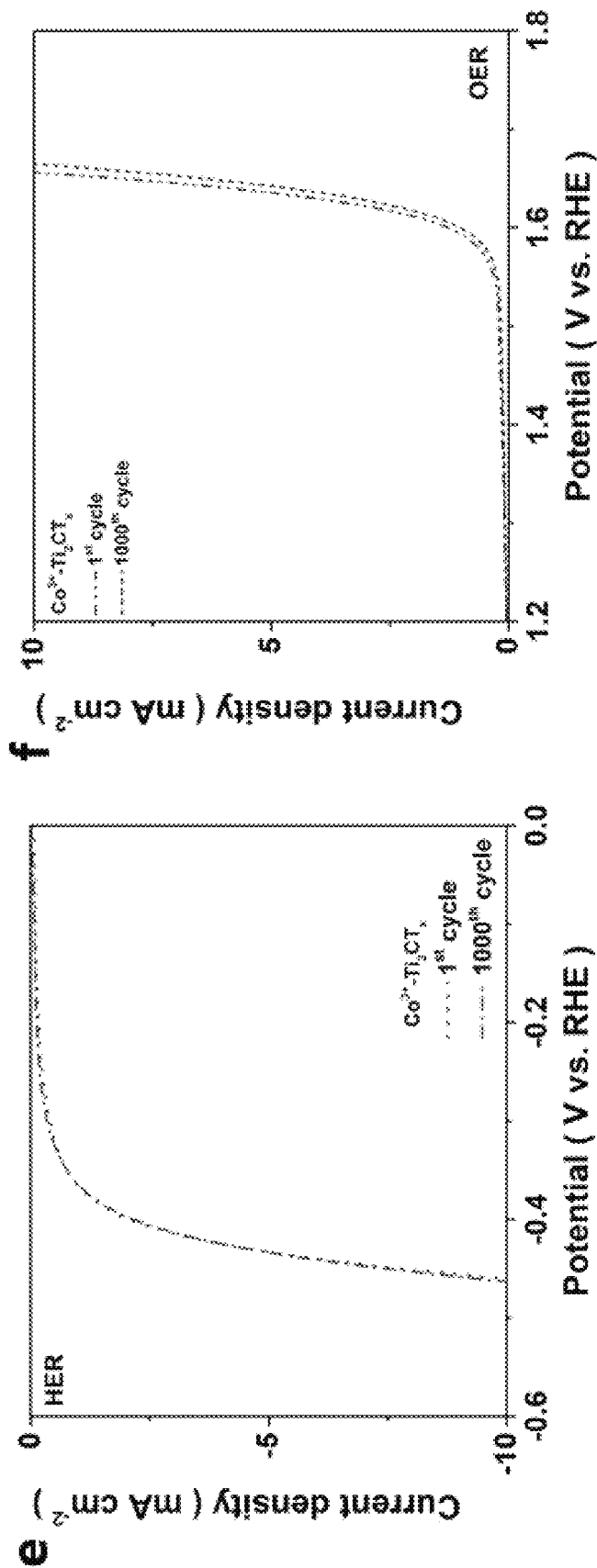

$C_{dif}$ and $C_{cap}$ were obtained from scan rate-dependent CVs of the E-etched products (FIG. 15 and Supporting formulae) and summarized in FIG. 3 for the discussion about HER activity of E-etched $Ti_2CT_x$. It is found that higher [HCl] leads to enhanced surface roughness and etching depth on the $Ti_2CT_x$, associated with slightly larger ECSA (FIG. 3); however, $\eta@J_s$ of the MXene is proportional to [HCl]. Therefore, the best HER activity of 1 M etched $Ti_2CT_x$ is ascribed to more effective —O/—OH surface groups present for the catalysis, as supported by greater $C_{dif}$ (FIG. 3) and Ti/O ratio (Table 2). It should be clarified that despite higher O atom %, 2 M/3 M-etched $Ti_2CT_x$ contain more inactive surface $TiO_2$ based on a reduced Ti:O ratio (Table 2) but enhanced $TiO_2$ Raman signal at ~150 cm$^{-1}$, in comparison to 1 M-etched MXene. This accounts for their restrained HER activity. However, under-/overheating conditions (at 25° C./80° C.) cause less superior HER catalytic performance of the $Ti_2CT_x$, as a consequence of demolishing the unique structural characters of MXenes, either by inefficient etching (FIG. 1c) or over-etching problem (FIG. 3). Accordingly, prolonged etching at the mild temperature prepares the most efficient HER catalyst, exhibiting $\eta@J_s$ and Tafel slope at 570 mV and 132 mV/decade, respectively. The overpotential is high for $Ti_2CT_x$ owing to its semiconducting feature; however unexpectedly, the $Cr_2CT_x$ and $V_2CT_x$ E-etched from optimized voltages exhibit comparably large $\eta@J_s$ at 540 and 610 mV, respectively. Such discrepancy from the theoretic values is probably attributed to unoptimized size and etching conditions. Particularly for these "hardly-etched" MXenes, higher temperature or [HCl] rationally improves etching efficiency and —O/—OH coverage on their surfaces for better catalytic properties. It is worth mentioning that their preliminary HER catalytic performance is comparable to some reported HF-etched MXenes and 2H $MoS_2$ (Table 3) because of O-rich surface and the basal electrocatalytic properties. In addition, the $TiC_2T_x$ has stable catalytic ability even after 1,000 cycles (FIG. 16). It performs better in 1 M KOH than in 1 M $H_2SO_4$ electrolyte because the HER is less favorable in the acidic environment. This indicates that the E-etched MXenes have potential to serve as a cathode material in alkaline fuel cell for OER.

TABLE 2

Quantitative EDX results with Ti2CTx different electrocatalyst.

| Catalyst | Ti At % | Al At % | O At % | C At % | Ti:Al | Ti:O |
|---|---|---|---|---|---|---|
| $Ti_2AlC$ | 31.79 | 15.83 | 0.96 | 53.11 | 2.01 | — |
| 1 M/80° C./9 h/0.3 V | 39.16 | 18.09 | 11.89 | 29.99 | 2.16 | 3.29 |
| 2 M/80° C./9 h/0.3 V | 35.71 | 18.88 | 12.16 | 33.51 | 1.89 | 2.94 |
| 3 M/80° C./9 h/0.3 V | 27.93 | 14.74 | 13.78 | 43.64 | 1.89 | 2.03 |

TABLE 2-continued

Quantitative EDX results with Ti2CTx different electrocatalyst.

| Catalyst | Ti At % | Al At % | O At % | C At % | Ti:Al | Ti:O |
|---|---|---|---|---|---|---|
| 1 M/25° C./9 h/0.3 V | 55.72 | 7.44 | 4.34 | 32.61 | 7.49 | 12.84 |
| 1 M/50° C./9 h/0.3 V | 62.64 | 16.03 | 4.67 | 16.74 | 3.91 | 13.41 |
| 1 M/50° C./3 h/0.3 V | 37.14 | 12.64 | 9.55 | 40.72 | 2.94 | 3.89 |

Metal Ion Doped-MXene as a Bifunctional Catalyst.

Figure 4:
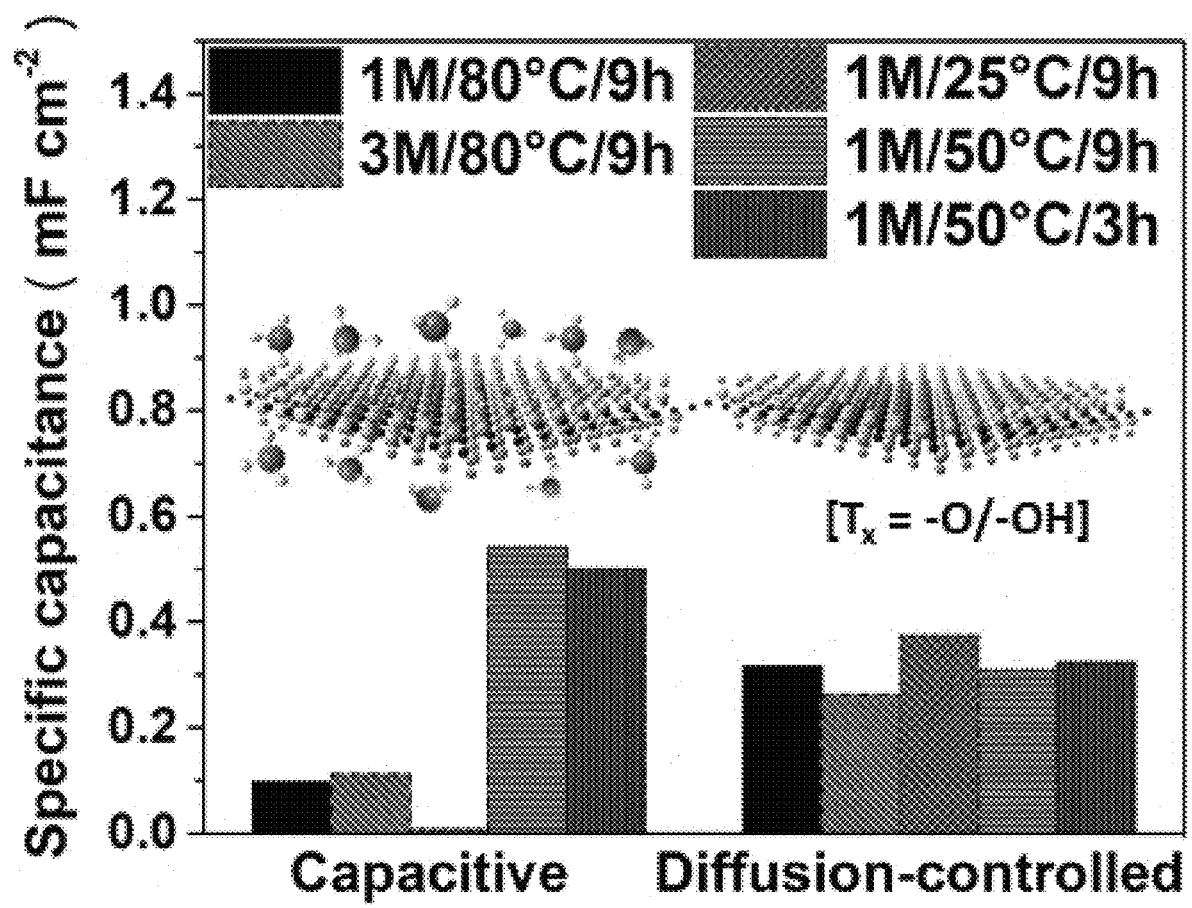
FIG. 4 depicts a bar chart showing the pseudocapacitive contribution for the various $Ti_2CT_x$ prepared in accordance with certain embodiments described herein as a mechanism study.
Figure 5:
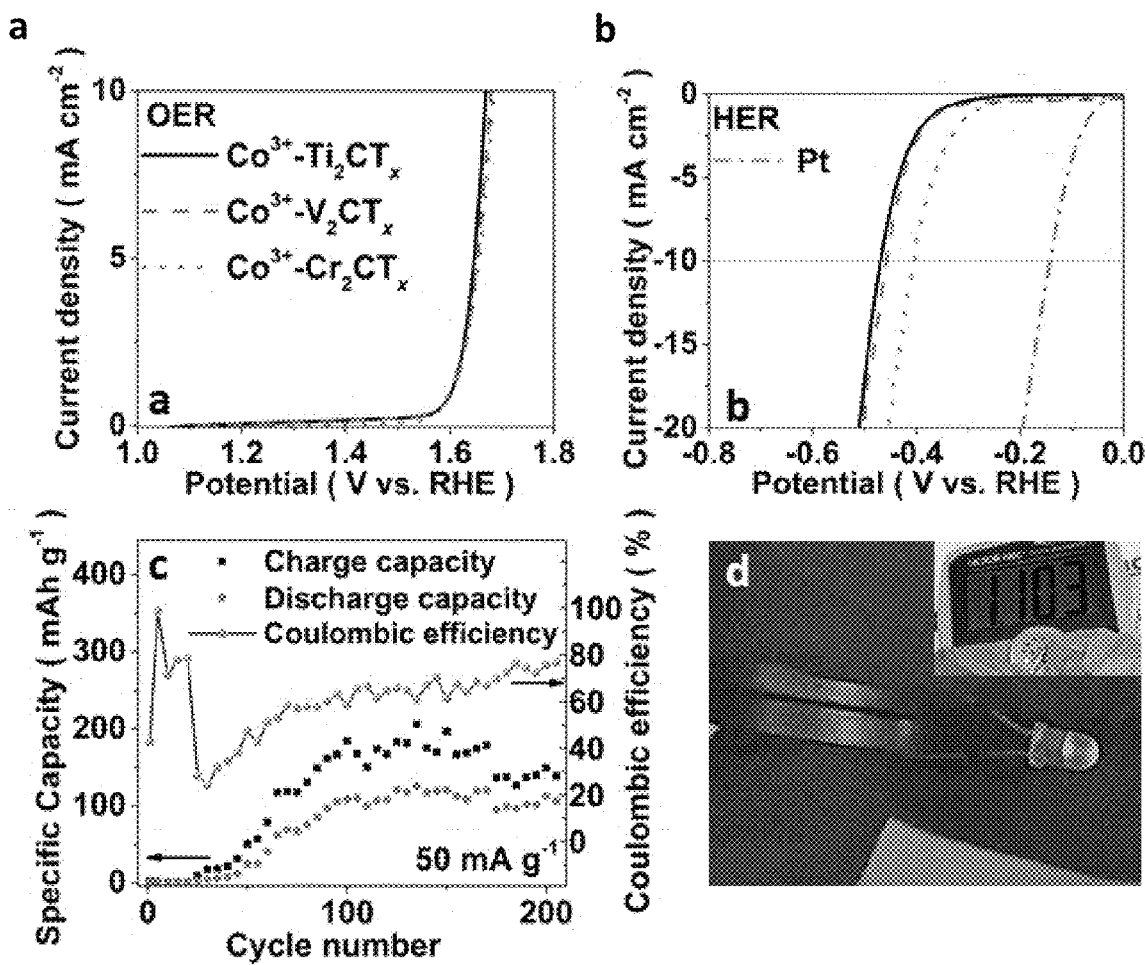
FIG. 5 depicts the properties of multifunctional E-etched MXenes prepared in accordance with the certain embodiments described herein. The anodic-going IR corrected LSVs of $Co^{3+}$-MXenes for (a) OER and (b) HER activity, respectively. (c) Cycling capacities and the Coulombic efficiency of $Cr_2CT_x$ cathode over 200 cycles at a current density of 50 mA $g^{-1}$. (d) Digital photo of a yellow LED powered up by two $Co^{3+}$—$Cr_2CT_x$-based zinc-air batteries, and the inset shows the measured voltage of 1.103 V across one battery.
Figure 17:
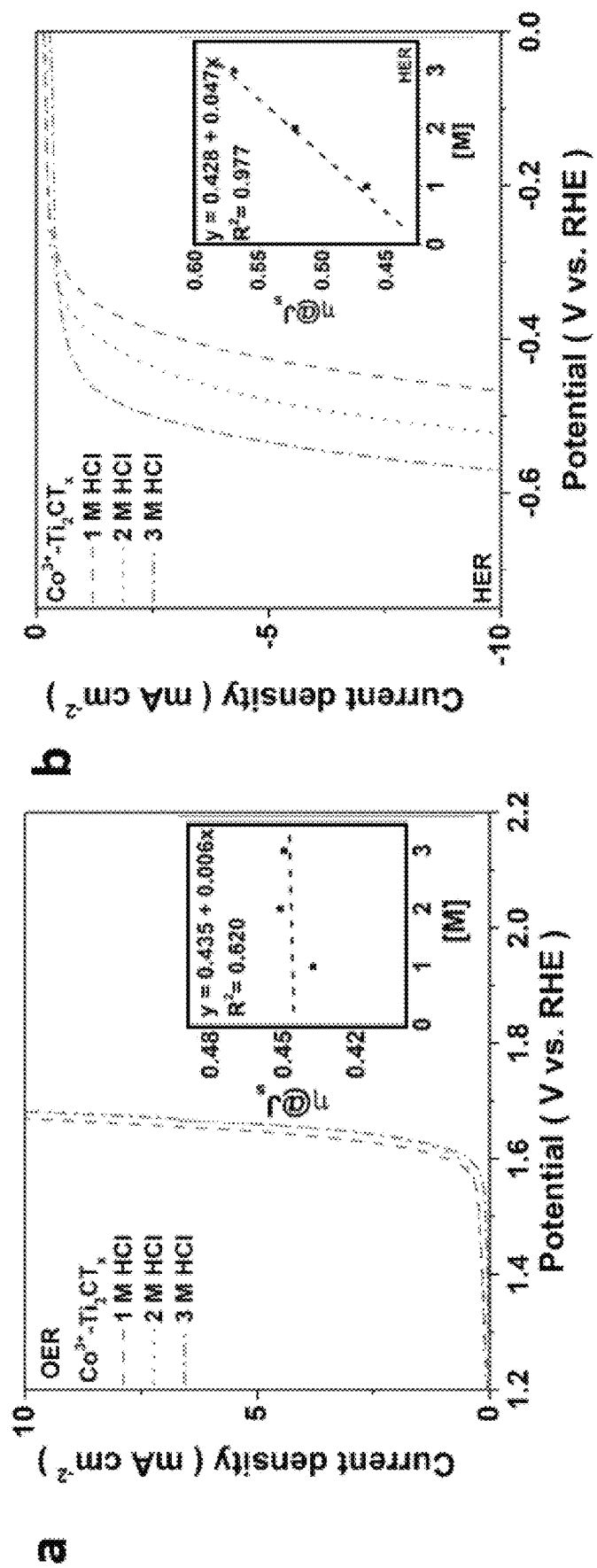
FIG. 17 depict data collected from studies on HER/OER performance and mechanism of $Co^{3+}$—$Ti_2CT_x$ prepared in accordance with certain embodiments described herein. The LSVs for $Co^{3+}$—$Ti_2CT_x$ etched with 1-3 M [HCl] for (a) OER catalysis and (b) HER catalysis (insets: linear relationship between $\eta@J_s$ and [HCl]). (c) $C_{cap}$ and $C_{dif}$ of the $Co^{3+}$—$Ti_2CT_x$ for HER. (Inset: linear relationship between specific total capacitance and scan rate). (d) Co 2p XPS spectra of $Co^{3+}$-$Ti_2CT_x@1M$ or 3M. (e) Raman spectra of the $Co^{3+}$—$Ti_2CT_x$ compared to $Ti_2CT_x$. (f) The atomic percentages of important elements in various samples obtained from the XPS results.
Figure 17:
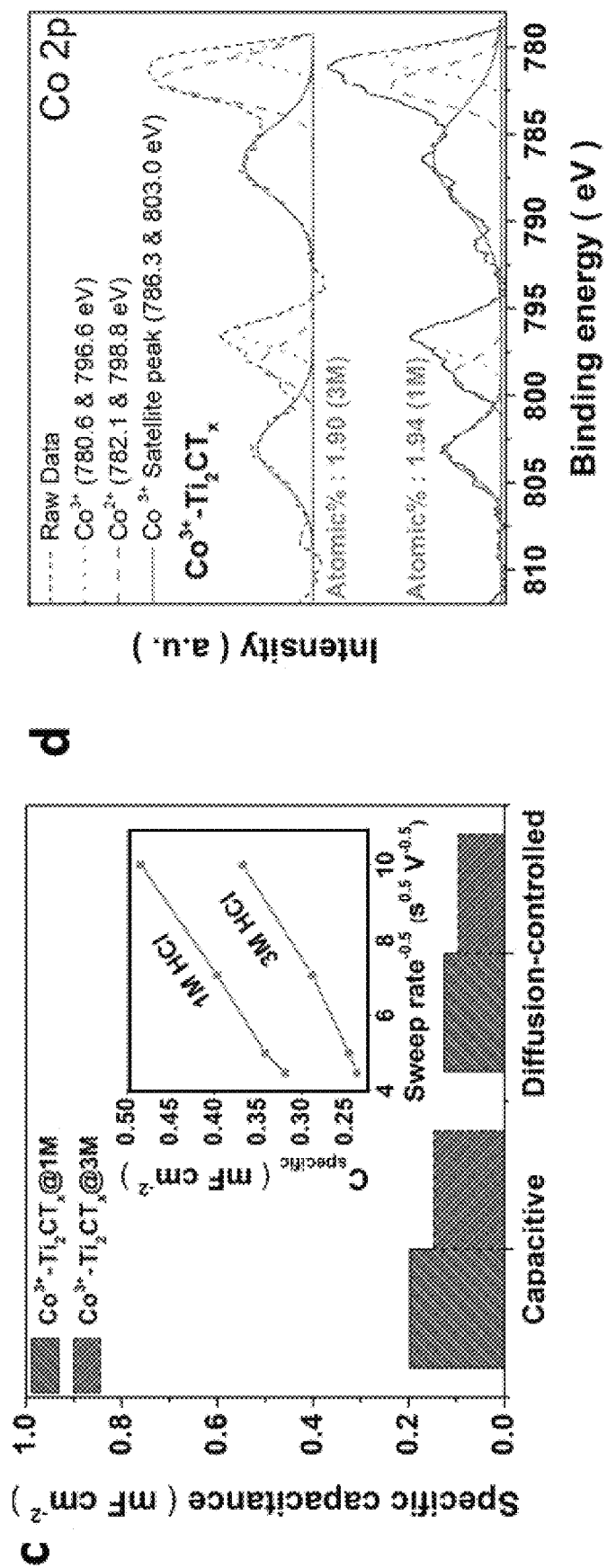
Figure 17:
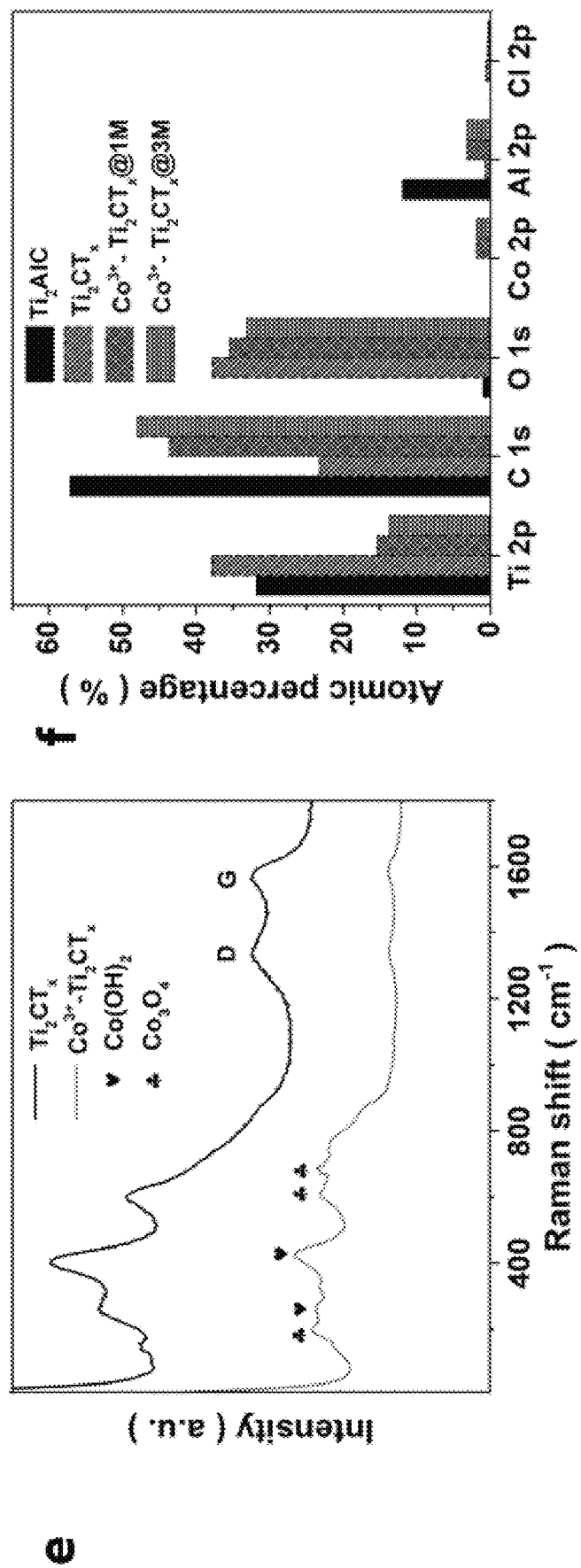

With high robustness and affinity toward transition metals (TM), MXenes are increasingly appealing for TM adsorption to enhance HER catalytic property and even to endow extra functionalities for diverse applications. In this regard, we successfully decorated our E-etched MXenes with OER-catalytic cobalt ($Co^{3+}$) ions (FIG. 4a, b), in order to achieve TM-promoted full water-splitting catalysis. The HER/OER catalytic performance of $Co^{3+}$-decorated MXenes ($Co^{3+}$—$Cr_2CT_x$/$V_2CT_x$/$Ti_2CT_x$) were tested in 1 M KOH electrolyte. The TM adsorption lowers the overpotentials for HER catalysis on all E-etched MXenes at least by 110 mV (Table 3), yet their performance ranking remains unchanged as the bare E-etched samples ($Co^{3+}$—$Cr_2CT_x$, 404 mV>$Co^{3+}$—$Ti_2CT_x$, 458 mV>$Co^{3+}$—$V_2CT_x$, 460 mV). In addition, FIG. 17 presents that [HCl] is positively proportional to $\eta@Js$ of the catalysts, which demonstrates the importance of $Co^{3+}$ ions in lowering the —OH binding energy for improved HER catalysis. In stark contrast to their various HER activities, negligible difference in OER activity is identified among these Co-MXenes with $\eta@Js$ of ~1.65 V and similar reaction kinetics (FIG. 4a). The results suggest that the OER catalytic feature is a synergistic effect of pore-rich MXenes and OER-active Co species but independent of the pristine MXenes. Accordingly, such OER catalytic ability is as good as many state-of-the-art OER catalysts including $IrO_2$ (1.690 V vs. RHE) as well as some reported Co-based materials (Table 3). Noted that the $Co^{3+}$ decoration does not alter the excellent catalytic stability of $Ti_2CT_x$ after 1,000 cycles, implying the E-etched MXenes is a stable electrocatalyst for full water-splitting. Importantly, this HF-free fabrication method can produce various good-quality MXenes as an alternative to the conventional electrocatalysts, and their catalytic uses can be extended via the incorporation with other electrochemically active materials such as Ni—Fe and CoP.

TABLE 3

Comparison catalytic performance with different MXene catalysts

| Material | Synthesis method (MXene) | Electrolyte | $\eta$ (mV) @ 10 mA cm$^{-2}$ | Tafel Slope (mV dec$^{-1}$) | Ref. |
|---|---|---|---|---|---|
| HER | | | | | |
| $Cr_2CT_x$ | E-etching | 1M KOH | 540 | 127 | This work |
| $V_2CT_x$ | E-etching | 1M KOH | 610 | 141 | This work |
| $Ti_2CT_x$ | E-etching | 1M KOH | 570 | 157 | This work |
| $Co^{3+}$—$Cr_2CT_x$ | In situ hybridization on $Cr_2CT_x$ | 1M KOH | 404 | 112 | This work |
| $Co^{3+}$—$V_2CT_x$ | In situ hybridization on $Cr_2CT_x$ | 1M KOH | 458 | 98.1 | This work |
| $Co^{3+}$—$Ti_2CT_x$ | In situ hybridization on $Ti_2CT_x$ | 1M KOH | 460 | 103 | This work |
| $Ti_2CT_x$ | 10% HF etched, 18 h, RT | 0.5M $H_2SO_4$ | 609 | 124 | 9 |
| Edge ox. 2H $MoS_2$ | — | 0.5M $H_2SO_4$ | ~530 | 186 | 10 |

TABLE 3-continued

Comparison catalytic performance with different MXene catalysts

| Material | Synthesis method (MXene) | Electrolyte | η (mV) @ 10 mA cm$^{-2}$ | Tafel Slope (mV dec$^{-1}$) | Ref. |
|---|---|---|---|---|---|
| OER | | | | | |
| Co$^{3+}$—Ti$_2$CT$_x$ | In situ hybridization on —Ti$_2$CT$_x$ | 1M KOH | 425 | 63.5 | This work |
| Co/N—CNTs @Ti$_3$C$_2$T$_x$ | HCl/LiF solution, 24 h, 35° C. | 0.1M KOH | 411 | 79.1 | 11 |
| Ti$_3$C$_2$T$_x$—CoBDC | 40% HF etched with hydrothermal, 6 h, 180° C. | 0.1M KOH | 410 | 48.2 | 12 |
| IrO$_2$ | — | 0.1M KOH | 460 | 63.8 | 12 |
| CoP@Ti$_3$C$_2$ | HCl/LiF solution, 24 h, 35° C. | 1M KOH | 320 | 59 | 13 |
| CoP | — | 1M KOH | 420 | 81 | 13 |

Energy Storage Performance of the E-Etched MXenes in ZIB and ZAB.

Figure 18:
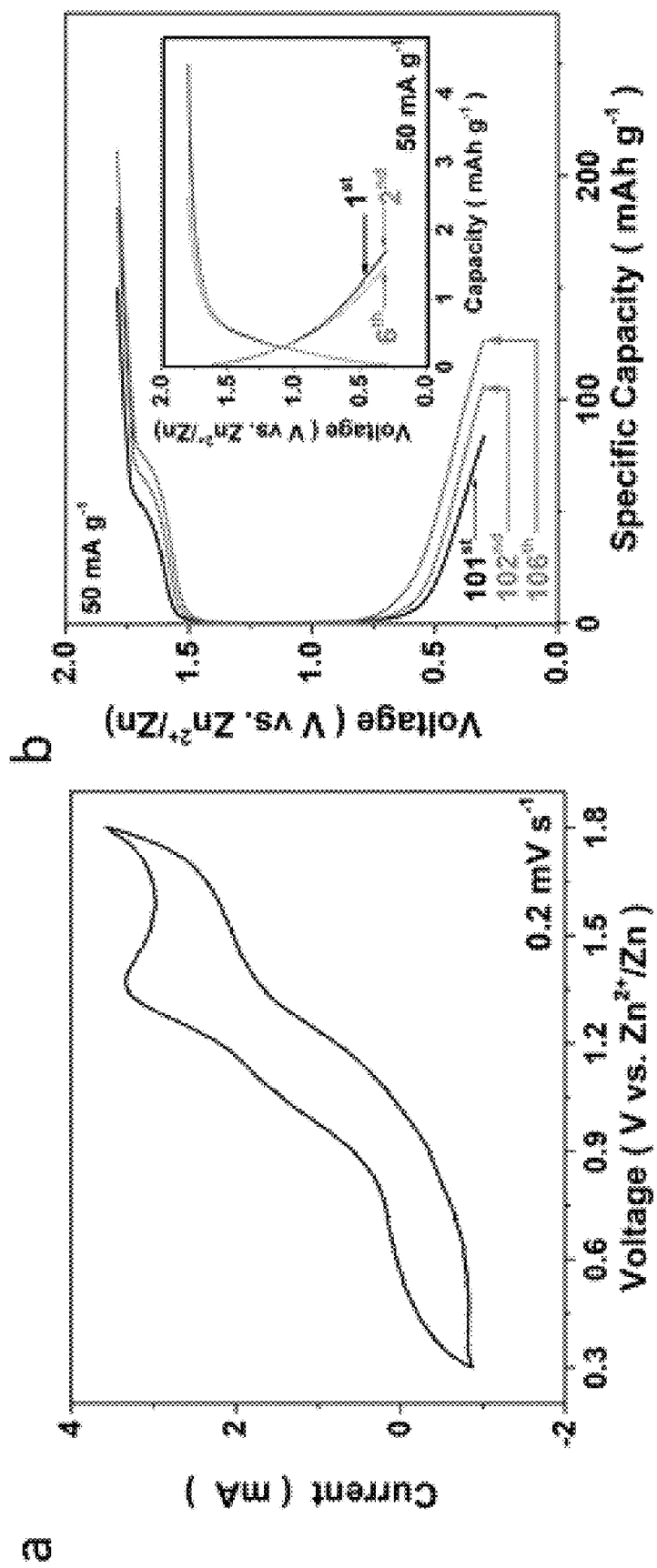
FIG. 18 depicts (a) CV of $Cr_2CT_x$ prepared in accordance with certain embodiments described herein swept at 0.2 mV $s^{-1}$. (b) Galvanostatic charge/discharge cycles of $Cr_2CT_x$ prepared in accordance with certain embodiments described herein for the $101^{st}$, $102^{nd}$ and $106^{th}$ cycle (inset: the $1^{st}$, $2^{nd}$ and $6^{th}$ cycle) at a current density of 50 mA $g^{-1}$.
Figure 19:
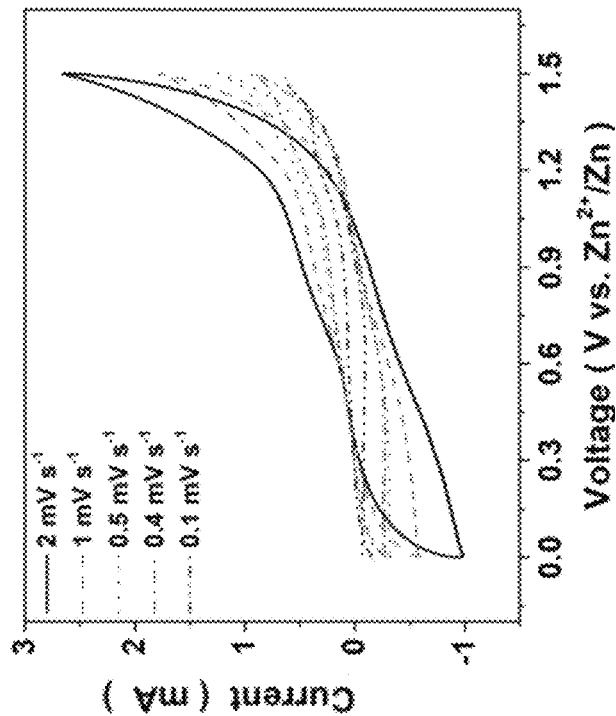
FIG. 19 depicts the electrochemical performance for the MXene-based ZIB fabricated using MXenes prepared in accordance with certain embodiments described herein. CVs for (a) $Ti_2CT_x$ and (b) $V_2CT_x$ cathode scanned from 2 mV $s^{-1}$ to 0.1 mV $s^{-1}$. The CVs are recorded from a freshly prepared battery without pre-activation process. The cycling capacities and coulombic efficiency of (c) $Ti_2CT_x$ and (d) $V_2CT_x$ cathode over 200 cycles at a current density of 50 mA $g^{-1}$. The fade of the capacity in $V_2CT_x$ at $180^{th}$ cycle may be attributed to the irreversible damage in Zn anode during the activation process. (e) The EIS spectrum of $Ti_2CT_x$, $Cr_2CT_x$ and $V_2CT_x$ from 1 MHz to 10 Hz. (f) CVs for the $Cr_2CT_x$ cathode at a scan rate of 2 $mVs^{-1}$ upon the $51^{st}$-$55^{th}$ cycles, showing an increasing capacity during cycling (inset: CVs for the $1^{st}$ and $101^{st}$ cycle).
Figure 19:
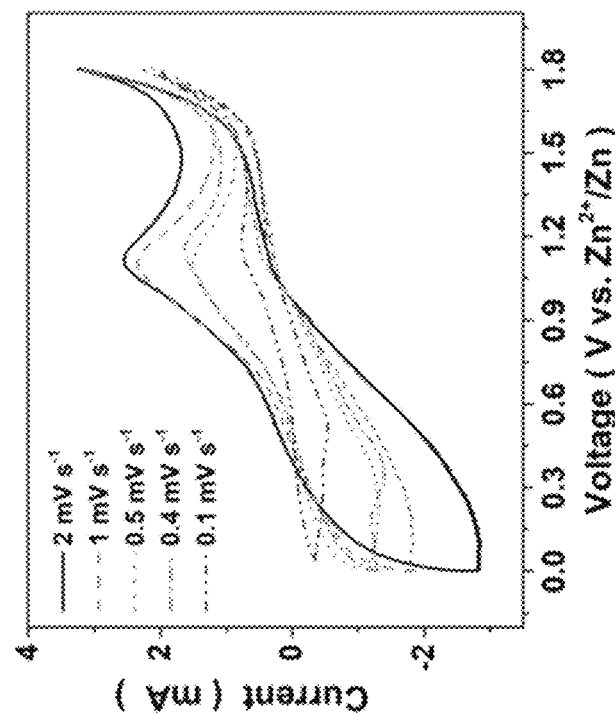
Figure 19:
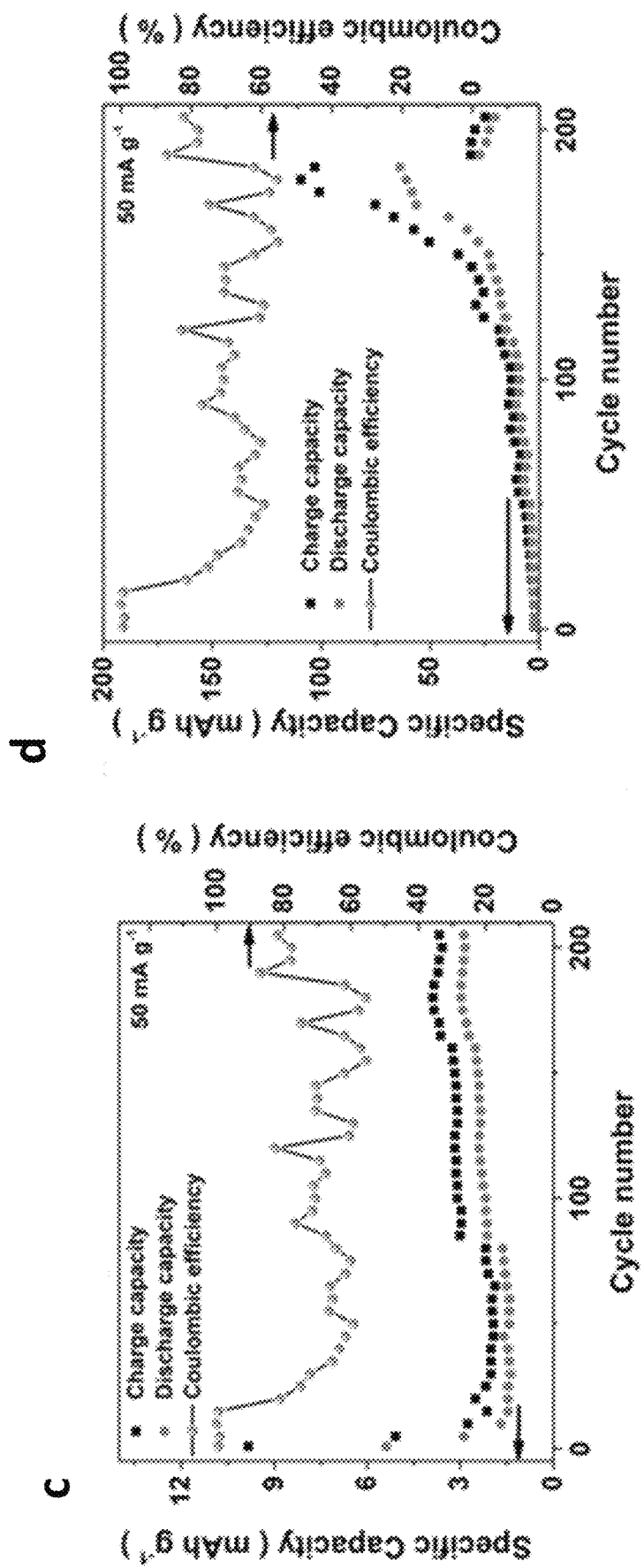
Figure 19:
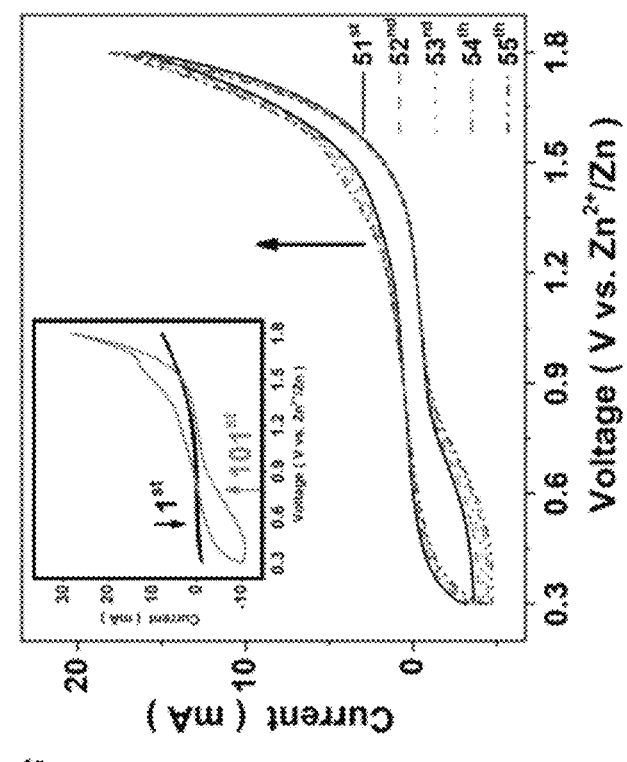
Figure 19:
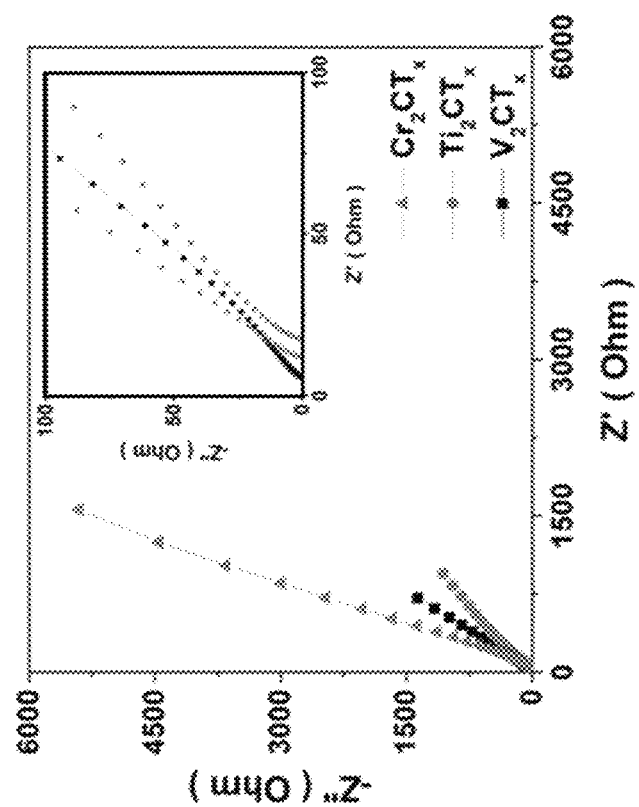
Figure 20:
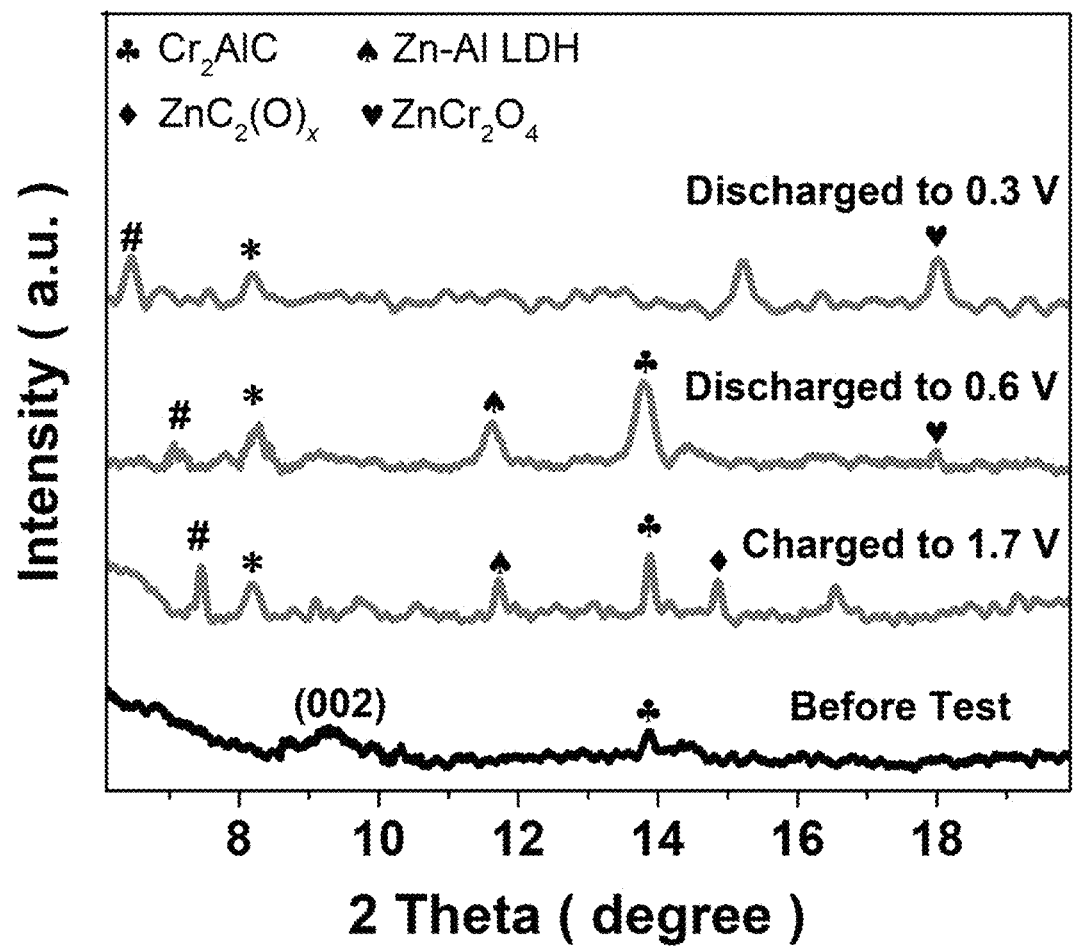
FIG. 20 depicts the energy storage mechanism in MXene ZIB cathode fabricated using MXenes prepared in accordance with certain embodiments described herein. XRD patterns of $Cr_2CT_x$ ZIB cathode before charge/discharge (Before Test), and at different charging status after 50 charging/discharging cycles. After the 50 cycles, the discharged-MXene shows an upshift (002) peak and new peaks contributed from Zn compounds, suggesting $Zn^{2+}$ intercalation is likely accounted for the energy storage. Hash sign (#) denotes the peak shift due to the intercalation of the zinc ion. While the asterisk sign (*) represents the expanded (002) peak of the MXene resulted from the activation process.
Figure 21:
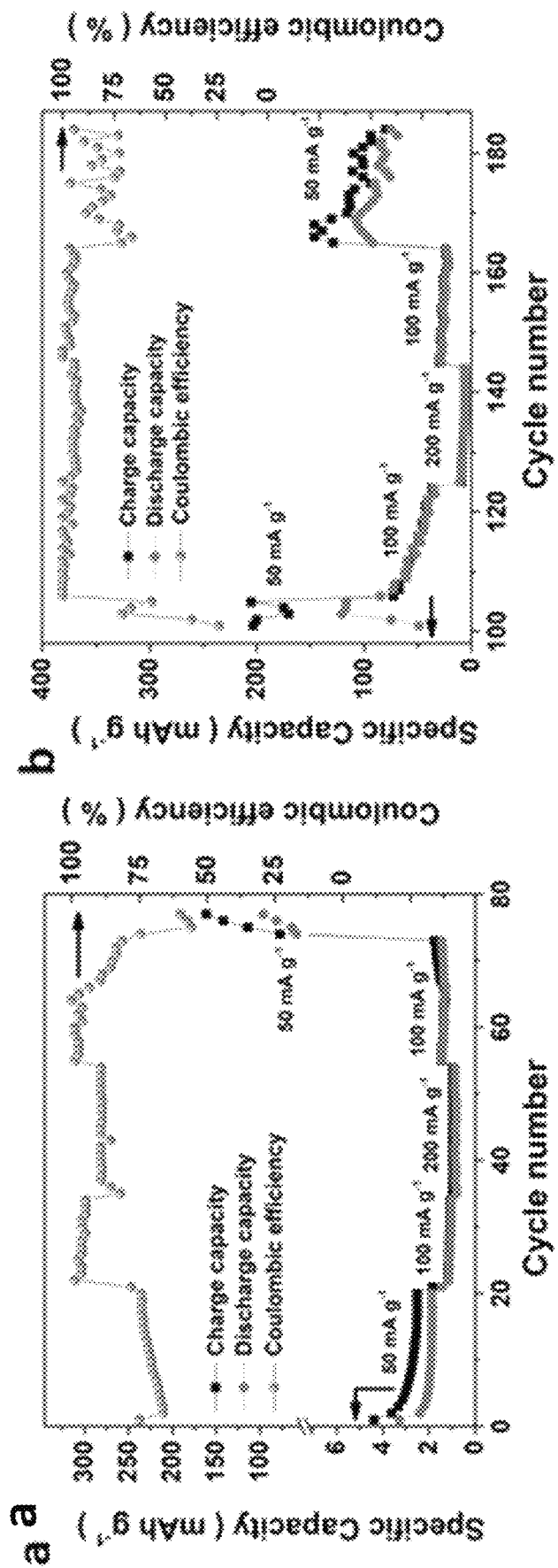
FIG. 21 depicts the energy storage performance of $Cr_2CT_x$ in ZIB system fabricated using MXenes prepared in accordance with certain embodiments described herein. The cycling and rate capability of $Cr_2CT_x$ under different current densities (a) before and (b) after activation. (c) CVs of $Cr_2CT_x$ at different scan rates from 2 mV $s^{-1}$ to 0.1 mV $s^1$ and (d) the capacitive and diffusion-controlled contribution ratio at different scan rates. (e) Charge and discharge cycles of $Co^{3+}$—$Cr_2CT_x$ and $Cr_2CT_x$ for the $101^{st}$, $102^{nd}$ and $106^{th}$ cycle at a current density of 50 mA $g^{-1}$. (f) Galvanostatic charge/discharge cycles of $Co^{3+}$—$Cr_2CT_x$ as a zinc-air battery at a charging current density of 100 mA $g^{-1}$ and discharging current density of 50 mA $g^{-1}$ (loading mass=0.5 mg $cm^{-1}$).
Figure 21:
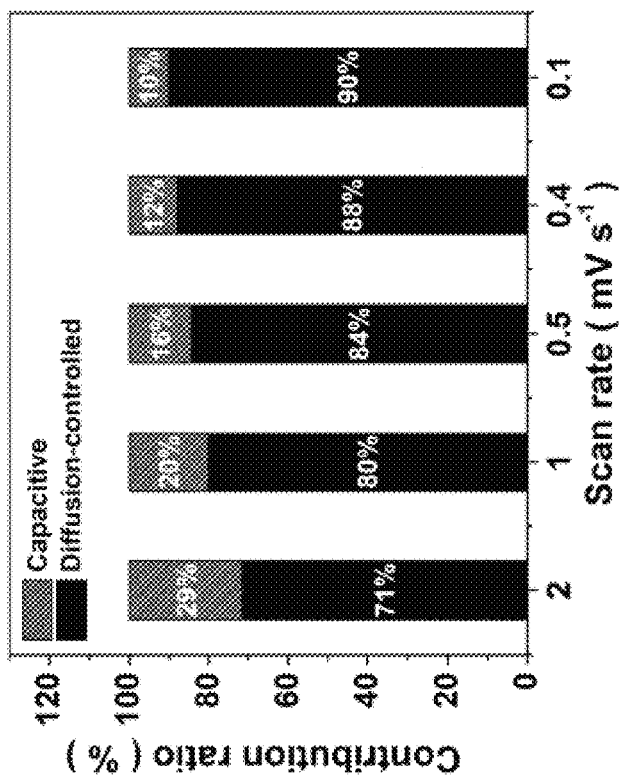
Figure 21:
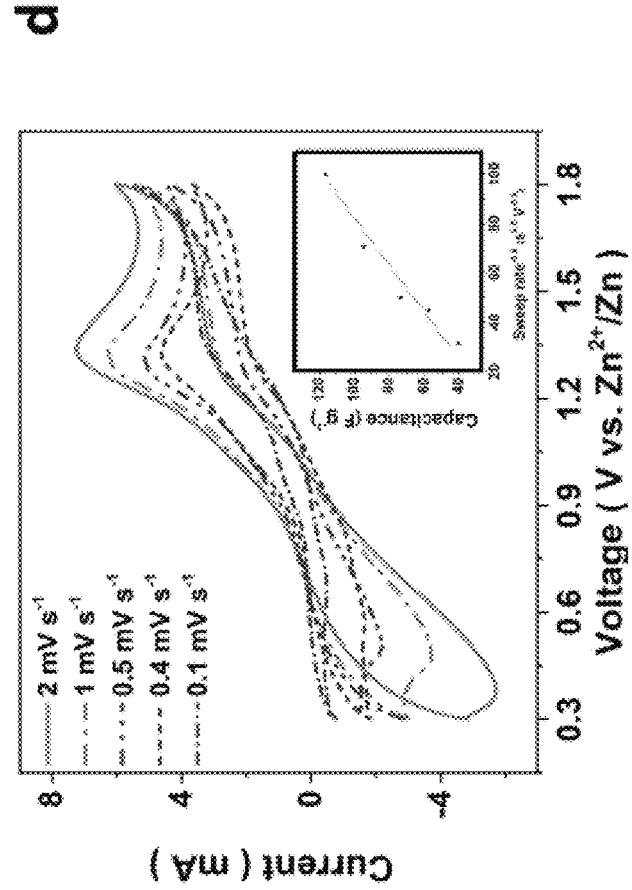
Figure 21:
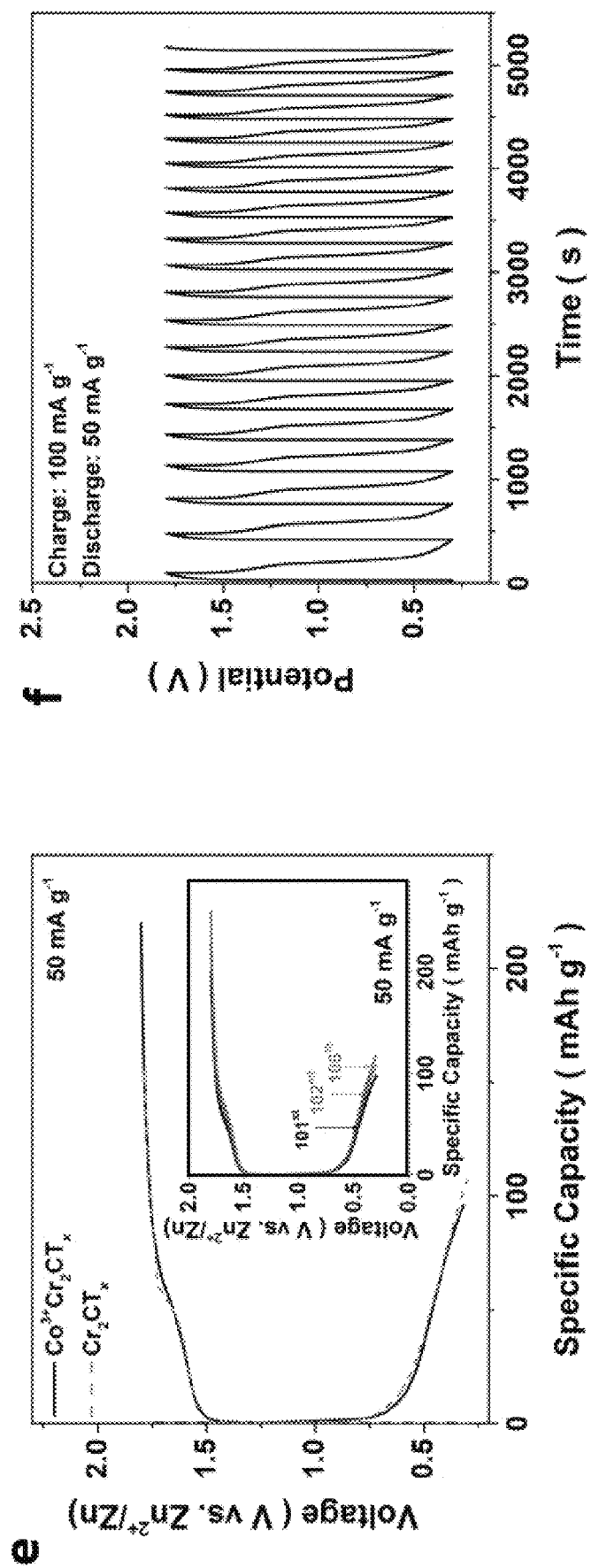

The E-etched MXenes were drop-casted onto carbon sheets as ZIB cathodes and their charging/discharging voltages were determined from individual CV measurements (FIGS. 18 and 19). Moreover, galvanic charge/discharge curves for Cr$_2$CT$_x$ cathode further ensure its charging/discharging processes triggered at 1.3 and 0.7 V respectively, indicating the average discharge voltage (0.5 V) of MXene-based ZIB, which is similar to other ZIB systems. The capacities of our MXene-based ZIB were recorded over 200 cycles at a charging/discharging current density of 50 mA g$^{-1}$. Cr$_2$CT$_x$ cathode achieves an energy density and power density down to 150 Wh kg$^{-1}$ and 75 W kg$^{-1}$, together with Coulombic efficiency of 77% (FIG. 4c); while V$_2$CT$_x$ and Ti$_2$CT$_x$ cathodes exhibit more inferior specific capacity and overcharged problem likely because of their less favorable electrochemical features. Furthermore, the Cr$_2$CT$_x$-based ZIB has outstanding capacity retention of 98% over 100 cycles (i.e., 100$^{th}$-200$^{th}$ cycle, FIG. 4c). It is ascribed to the activation effect of Cr$_2$O$_3$ formation on the MXene and the water-lubrication of accessible Zn sites in the first 100 cycles, in which the MXene displays an increased capacitance and an upshifted (002) peak from 9.28° to 8.18°. To examine the energy storage mechanism in this ZIB system, XRD patterns of the Cr$_2$CT$_x$ cathode before charging and after 50 charging/discharging cycles were recorded FIG. 20. As the device was at the 0.3 V discharging status, ZnCr$_2$O$_4$ was found in the MXene cathode, and it gives rise to new XRD peaks at 15.2°, as well as the enlarged (002) interlayer spacing of Cr$_2$CT$_x$ (with an upshifted XRD peak from 8.18° to 6.48°). Notably, those new XRD features of the Cr$_2$CT$_x$ are reduced, while the (002) peak downshifts to 7.45° after charging to 1.7 V. Hence, it is believed that the energy storage mechanism involves intercalation of Zn$^{2+}$ ions into the cathode. This process plays an important role in activating the ZIB in which the rate capability of Cr$_2$CT$_x$ is significantly increased by 60-fold with Coulombic efficiency of 95% at the discharging current density of 100 mA g$^{-1}$ (FIG. 21). The diffusion-controlled capacitive factor increases from 71% to 90% with decreasing scan rate charge, indicating Cr$_2$CT$_x$ cathode is mainly controlled by the diffusion process. In light of the promising charge storage capability of bare E-etched MXene and Co$^{3+}$-promoted OER activity, Co$^{3+}$—Cr$_2$CT$_x$ was exploited in a zinc ion and zinc-air/cobalt oxide battery as a proof-of-concept experiment. Thanks to the OER/ORR active surfactant (Co$_3$O$_4$) and the layered structure, the Co$^{3+}$—Cr$_2$CT$_x$ can serve as a ZIB/ZAB by simply changing the electrolyte. It powered up a yellow light emitting diode (LED) after charging for 500 s at a current density of 100 mA g$^{-1}$ (FIG. 4d), further demonstrating the practical use of the MXene-based devices for energy storage and conversion applications. Nonetheless, we believe that it is vital to enhance the ORR activity to attain a high-performance ZAB; and the optimization of structure and surface properties of MXenes can enhance Zn$^{2+}$ ion uptake for improving the ZIB energy storage performance.

CONCLUSION

In conclusion, as a much safer and milder method than the conventional HF-etching, the E-etching method with diluted HCl is developed to prepare MXene (Ti$_2$CT$_x$), whose structural and surface properties changed with various E-etching conditions. This method has been successfully extended to produce other MXenes (e.g., V$_2$CT$_x$ and Cr$_2$CT$_x$), which provides an effective solution to the longstanding problem with concentrated HF involved, and to demonstrate its promises as a universal way for MXene preparation. The as-synthesized MXene via the HF-free strategy can reach to 25 μm and a flower-like architecture. Moreover, the E-etched MXenes exhibited not only HER but also the capability of Co$^{3+}$ ion adsorption to form a multifunctional catalyst for E-chem water splitting under alkaline medium. The HER (404 mV) and OER (η@Js=425 mV) activities of Co$^{3+}$-decorated MXenes are comparable to some state-of-the-art catalysts. Also, the practical energy storage and conversion applications of Co$^{3+}$-MXene cathode are tested as a mode of switchable battery. The E-etched MXenes are also demonstrated for energy storage in aqueous ZIB systems and the optimized MXene exhibited a specific capacity of 100 mAh g$^{-1}$@50 mA g$^{-1}$. Therefore, this work paves a way to develop HF-free and rapid synthesis of 2D layered MXenes, which is very attractive for efficient heavy metal absorption and multifunctional electrocatalytic and energy storage applications.

The comparisons between the method of the present disclosure and existing methods are summarized in Table 4, which shows the advantageous technical effects of the method of the present disclosure over existing methods.

TABLE 4

The comparisons between the method of the present disclosure and existing methods

| Method | Thermal-assisted 3D electrode electrochemical etching | HCl + floride etching | HF etching |
|---|---|---|---|
| Required synthesis time ($Ti_2C$) | 9 h | 24 h | 24 h |
| Required synthesis time ($V_2C$) | 9 h | 96 h | 96 h |
| Required synthesis time ($Cr_2C$) | 9 h | Not appliable | Not appliable |
| Potential hazards | Chlorine is possible to release. Most of the gases were dissolved in electrolyte as the releases speed is slow. | A direct evolution of HF gases during the etching process. Possible to penetrate the skin and corrode the bones. | A direct evolution of HF gases during the etching process. Possible to penetrate the skin and corrode the bones. |

EXAMPLES

Example 1—Surface Modification of CFCs

All materials in this work were of analytical grade, which were received and used without any further purification. Carbon fiber cloths (CFCs) were purchased from CeTech (W0S1002) with a thickness of 0.33 mm. The CFCs were treated with nitric acid surface modification as described elsewhere. The CFCs were washed under sonication in acetone and ethanol to remove their surface organic grease. Then, the CFCs were immersed in concentrated nitric acid (63 wt. %, Sigma) with refluxing at 125° C. for 3 h. Afterwards, the CFCs were neutralized with 1 M NaOH (aq).

Example 2—Fabrication of MXenes

All MXenes studied in this work were synthesized by E-etching method in a standard three electrode configuration. The 3D composite electrode was fabricated by mixing MAX-phase powder ($Ti_2AlC$, $V_2AlC$ and $Cr_2AlC$, >99%, Laizhou Kai Ceramic material Co., Ltd) and conductive carbon black (CB) at a mass ratio of 95:5, with 1 mL PVA (1 wt. %) as a binder. The TIMCAL SUPER P Li™ CB was purchased from TangFeng Tech. Inc. with a diameter of 40 nm and a surface area of 62 $m^2$ $g^{-1}$. After that, 10 mg mixture was grinded and sonicated for 30 min to ensure the powder was mixed properly.

In a route for the preparation of the composite electrode, 10 mg of MAX-phase material/carbon black composite (95:5) was dip-casted onto a carbon fiber cloth (1×4 $cm^2$). Subsequently, the MAX-phase composite electrode dried on a hot plate with 55° C. for 30 minutes. The dried MAX-phase composite electrode is stored in a dry box to avoid oxidation and ageing.

Electrochemical etching carries out by electrochemical workstation (Solartron™ Analytical CellTest System 1470E). The platinum plate utilizes as the working electrode (1×4 $cm^2$) and the 3D MAX phase composite electrode uses as the working electrode (1×4 $cm^2$), which held by anti-corrosive electrode holder. The reference electrode is the standard calomel electrode filled with saturated KCl solution. A 50 mL of dilute HCl (1 M) electrolyte is filled in a 100 mL electrochemical cell and prepared for the electrochemical etching process.

Seeking the optimal electrochemical conditions: First, the range of effective etching potential preliminary confirms by the cyclic voltammetry and identifies two distinguished etching potentials (peaks). According to theory, the M-X bond is stronger than M-A in MAX phase material. Thus, the first peak (the peak relatively near to 0 V) considers as the "A" layer removal potential and the second peak is the "M" layer removal potential. The potential in between the first and the second peak is tested, for seeking the optimized etching potential. Second, the thermal-assisted procedure is favourable for selective etching of "A" layer, and thus various etching temperatures were tested for optimization. Third, the effect of the carbon materials also tested. In the process of optimization, scanning electron spectroscopy, Raman spectroscopy, X-ray photoelectron spectroscopy and electrochemical measurements (including linear sweep voltammetry, cyclic voltammetry, and electrochemical impedance spectroscopy) were used as a tool for determining the etching effect.

Example 3—Purification of the MXenes

The freshly-etched MXene was collected from the CFC by rinsing the composite electrode with ethanol and sonication for ~20 s. Then, the product mixture was first purified by sonication at room temperature for 30 min and centrifuge at 2,000 r.p.m. for 5 min. The supernatant containing MXene sheets was collected by decantation and centrifuge at 9,000 r.p.m. for 10 min. The sheets were further purified with ethanol and sonication for several times to remove unetched MAX-phase material and CB. Finally, ~5 mg MXene sheets were collected.

Example 4—Preparation of $Co^{3+}$-Decorated MXenes

The purified MXenes were sonicated with 1 M NaOH(aq) to induce negative surface charges and allow ion exchange of —Cl to —OH. The samples were washed with D.I. water several times and the pH value was tuned to 8 to make NaOH—$Ti_2CT_x$. $Co(NO_3)_3$ was mixed with the NaOH-MXene, followed by sonication and vortex to ensure a thorough mixing. The mixture was incubated for 3 h to ensure the complete alkalization and electrostatic reaction.

Example 5—Characterization

Powder X-ray diffraction (XRD) patterns of various MXenes were recorded using a Rigaku smart lab 9 kW (Rigaku, Japan) with Cu Kα radiation (λ=0.15406 nm). The morphology and size of $Ti_2AlC$ and MXenes were characterized by using JEOL Model JSM-6490 Scanning Electron Microscope (SEM) equipped with an Oxford Instrument energy dispersive X-ray (EDX) spectrometry system, separated at 200 kV. X-ray photoelectron spectroscopy (XPS) analysis was conducted in the system of a Sengyang SKL-12 electron spectrometer equipped with a VG CLAM 4MCD electron energy analyzer. Al Kα source (1253.6 eV) operated at an accelerating voltage of 10 kV and emission current of 15 mA. The Raman spectra of the samples were obtained from a Witec Confocal Raman system equipped with an excitation source of continuous wave 532 nm diode laser.

Example 6—HER Test

The electrochemical characterizations were evaluated by using Solartron Electrochemical workstation with standard three electrode system in 1 M KOH (aq) and 0.5 M $H_2SO_4$ (aq). A polished glassy carbon (GC) electrode was served as working electrode while a carbon rod and a standard calomel electrode filled with saturated KCl solution were used as counter and reference electrode, respectively. The MXene catalysts were dispersed in 0.5 mL D.I. water and drop-casted onto GC electrode without adding extra binder and conductive polymer. The mass loading on the working electrode was 0.1 mg $cm^{-2}$ for all catalysts. The LSVs were recorded at a scan rate of 5 mV $s^{-1}$.

Example 7—OER Test

The OER performances were recorded from Solartron Electrochemical workstation with the same setup as the HER test, and without oxygen purging to the system. The LSVs were recorded at a scan rate of 5 mV $s^{-1}$.

Example 8—Cell Fabrication and Test

The electrochemical test of MXene-based zinc ion batteries was carried out in a coin cell. The cathodes were prepared by drop-casting the MXene powder (loading mass=0.2 mg $cm^{-2}$) on to carbon paper. No additives were added during the cathode preparation. The carbon paper was dried at 50° C. for 24 h. High-purity zinc foil was used as the anode. Celgard microporous membrane (2325) with a thickness of 25 μm and pore size of 0.03 μm was used as the separator, and 2 M $ZnSO_4$ (aq) was used as the electrolyte in the cell of ZIB while 0.44 g $Zn(CH_3CO_2)$ dissolved in 1 mL of 6M KOH was used as the electrolyte for zinc air/cobalt oxide hybrid battery. Cycling voltammetry, galvanic charge/discharge and electrochemical impedance spectroscopy experiments were carried out at Solartron Electrochemical workstation. The zinc-MXene ion battery was tested in a potential window of 1.5 V (from 0.3 V to 1.8 V), while the electrochemical impedance spectroscopy was scanned from 1 MHz to 10 Hz with an amplitude of 5 mV vs. OC.

Example 9—The Effects of $Co^{3+}$ Absorption and the Characterization of $Co^{3+}$-MXene The effects were investigated on $Co^{3+}$—$Ti_2CT_x$ as a representative. The spectroscopic including XPS and Raman analysis concluded that the $Co^{3+}$ ions bond to OH or O groups on the $Ti_2CT_x$ surface to form $Co(OH)_2$ and $Co_3O_4$ species (FIG. 17). The $Co_3O_4/Co(OH)_2$ is changed with the O/OH ratio on the $Co^{3+}$—$Ti_2CT_x$, where more Co in form of $Co_3O_4$ leads to greater HER activity because of the lowered H—O binding strength on the MXene (FIG. 17). With increasing [HCl], η@$J_s$ for HER of the $Co^{3+}$—$Ti_2CT_x$ increased linearly while its $C_{cap}$ and $C_{dif}$ decreased slightly (FIG. 17). XPS spectra (FIG. 17) verify that $Co^{3+}$ ions are successfully adsorbed on the sample surface. The high-resolution Co 2p spectrum shows two sets of doublets for $Co^{2+}$ (797.9 and 782.2 eV) and $Co^{3+}$ (796.9 and 781.0 eV) species along with two strong satellite peaks at 803.0 and 786.7 eV. These analyses are consistent with the forementioned HER results of the pristine MXenes, probably owing to the different interfacial structures of the samples.

Supporting Formulas

Separation of Capacitive and Diffusion-Controlled Capacitance.

By integrating v-dependent current densities of the catalysts within a narrow potential window from −0.05 to −0.15 V vs. RHE. The specific capacitances responsible for $C_{dif}$ and $C_{cap}$ were estimated for the mechanism studies.

$$_{total}=A_1+A_2v^{0.5} \tag{Eq. S1}$$

$$C_{total}=C_{cap}+C_{dif} \tag{Eq. S2}$$

Where $C_{total}$, $C_{cap}$ and $C_{dif}$ are the total capacitance, capacitive capacitance and diffusion-controlled capacitance of the $Ti_2CT_x$, respectively; $A_1$ and $A_2$ are constants while v is the scan rate.

The Interfacial Charge and Surface Kinetics Related Equations $$Q=Q_{=\infty}+\text{constant}(v^{-0.5}) \tag{Eq. S3}$$

where $Q_{total}$ is the accumulated charges on the electrode, and the charges accumulated on the inter surface and the outer surface are written in $Q_{inter}$ and $Q_{outer}$ respectively. $Q_{=\infty}$ represents capacitive contribution charges and the diffusion-controlled charges which is limited by $v^{-0.5}$ where v is the scan rate[1].

$$i=K_1v+K_2v^{0.5} \tag{Eq. S4}$$

where $K_1$ and $K_2$ are constants.

$$C=\frac{1}{Vv}\int i dV \tag{Eq. S5}$$

The ∫i dV value can be obtained by integrating the curve under the cathodic peak, and V is the potential window.

Tafel Equation $$\eta=b \log i+a \tag{Eq. S6}$$

where η the overpotential, b is the Tafel slope and a is the exchange current density and i is the current density.

Potential Conversion Between Saturated Calomel Electrode to Reversible Hydrogen Electrode $$E_{RHE}=E_{SCE}+0.241+0.059pH \quad \text{(Eq. S7)}$$

Hydrogen Evolution Reaction (HER) in Alkaline Solution

In alkaline medium, three separate reaction steps are possible when the hydrogen is evolved at the catalyst modified electrode surface.

Volmer reaction Discharge reaction (120 mV dec$^{-1}$):

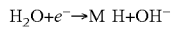

$$H_2O+e^- \rightarrow M\ H+OH^-$$

Tafel reaction Combination reaction (30 mV dec$^{-1}$):

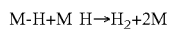

$$M-H+M\ H \rightarrow H_2+2M$$

Heyrosky reaction Ion+atom reaction (40 mV dec$^{-1}$):

$$H_2O+e^-+M\ H \rightarrow H_2+OH^-$$

where the "M" represents the catalyst.

The Calculation of Capacity for the Zinc Ion Battery $$C=I\Delta t/3600*m \quad \text{(Eq. S8)}$$

where C is the specific capacity, t is the discharge/charging time, I is the current and m is the mass of the active material.

What is claimed:

1. A method for preparing a MXene, the method comprising:
   providing a composite electrode comprising at least one MAX-phase composition and a carbonaceous material, wherein the at least one MAX-phase composition has an empirical formula of $M_{n+1}AX_n$, wherein M is Ti, A is Al, X is C, and n is 1;
   a counter electrode; and
   an aqueous electrolyte solution comprising 1 M HCl between and in contact with the composite electrode and the counter electrode; and
   applying an electric current at a potential of 0.3 V between the composite electrode and the counter electrode for 9 hours resulting in electrolytic reduction of the at least one MAX-phase composition thereby forming the MXene, wherein the electrolytic reduction is conducted at a temperature between 45 to 55° C.

2. The method of claim 1, wherein the carbonaceous material is carbon black (CB), carbon fiber cloth (CFC), or a mixture thereof.

3. The method of claim 1, wherein the composite electrode further comprises a binder.

4. The method of claim 1, wherein the at least one MAX-phase composition and the carbonaceous material are present in the composite electrode in a mass ratio of 80:20 to 99:1, respectively.

5. The method of claim 4, wherein the composite electrode further comprises a binder, wherein the binder is present in the composite electrode at 0.1 to 3% by weight.

6. The method of claim 1, wherein the at least one MAX-phase composition and the carbonaceous material are present in the composite electrode in a mass ratio of 80:20 to 99:1, respectively and the binder is present in the composite electrode 0.1 to 2% by weight.

7. A method for preparing a MXene, the method comprising:
   providing a composite electrode comprising at least one MAX-phase composition; a carbonaceous material selected from the group consisting of CB, CFC, and combinations thereof; a binder, wherein the at least one MAX-phase composition has an empirical formula of $M_{n+1}AX_n$, wherein each of M is Ti; A is Al; and each X is C; and n is 1; wherein the at least one MAX-phase composition and carbonaceous material are present in the composite electrode in a mass ratio of 90:10 to 99:1; and wherein the binder is present in the composite electrode in a weight ratio of 1.0-1.5% by mass;
   a counter electrode; and
   an electrolyte solution comprising 1 M HCl between and in contact with the composite electrode and the counter electrode; and
   applying an electric current between the composite electrode and the counter electrode at a voltage 0.3 V for 9 hours resulting in the electrolytic reduction of the at least one MAX-phase composition thereby forming the MXene, wherein the electrolytic reduction is conducted at a temperature between 45 to 55° C.

* * * * *